United States Patent
Modesitt et al.

(10) Patent No.: US 12,430,142 B2
(45) Date of Patent: *Sep. 30, 2025

(54) CUSTOMIZABLE INITIALIZATION ORCHESTRATION MODULE PROVIDING A GRAPHICAL PREVIEW OF A GRAPHICAL STATUS SCREEN USER INTERFACE

(71) Applicant: Kandji, Inc., San Diego, CA (US)

(72) Inventors: Brandon Modesitt, Encinitas, CA (US);
Wesley Pettit, San Diego, CA (US);
Nicholas McDonald, San Diego, CA (US); Adam Pettit, San Diego, CA (US); Mark Daughters, San Diego, CA (US)

(73) Assignee: Kandji, Inc., Coral Gables, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,716

(22) Filed: Jun. 13, 2024

(65) Prior Publication Data
US 2024/0330015 A1 Oct. 3, 2024

Related U.S. Application Data

(63) Continuation of application No. 17/663,112, filed on May 12, 2022, now Pat. No. 12,045,630.

(51) Int. Cl.
*G06F 9/445* (2018.01)
*G06F 3/04847* (2022.01)

(52) U.S. Cl.
CPC ...... *G06F 9/44505* (2013.01); *G06F 3/04847* (2013.01)

(58) Field of Classification Search
CPC .......................... G06F 9/44505; G06F 3/04847
See application file for complete search history.

(56) References Cited

U.S. PATENT DOCUMENTS 10,564,834 B2 * 2/2020 Latzina .................. G06F 9/451
10,824,690 B2 * 11/2020 Knight .................. H04L 67/306
(Continued)

OTHER PUBLICATIONS

Fleetsmith Features, www.fleetsmith.com/features/onboarding, Accessed on Nov. 24, 2021, 9 pages.
(Continued)

*Primary Examiner* — Tammara R Peyton
(74) *Attorney, Agent, or Firm* — MLO, a professional corp.

(57) ABSTRACT

A method involves generating, using a web-portal provided by a management platform operating at a server, initialization orchestration module configuration data using a graphical customization user interface. The graphical customization user interface provides a graphical preview of a graphical status screen user interface. An initialization orchestration module instantiated at a computing device displays the graphical status screen user interface in accordance with the initialization orchestration module configuration data. A device agent instantiated at the computing device processes a first configuration item of a list of configuration items. The initialization orchestration module using the graphical status screen user interface, displays a status of the first configuration item in accordance with first status messages regarding the first configuration item as the device agent processes the first configuration item.

20 Claims, 22 Drawing Sheets

(56) References Cited

U.S. PATENT DOCUMENTS

| | | | |
|---|---|---|---|
| 11,016,646 B1* | 5/2021 | Totale | G06F 3/04842 |
| 11,169,893 B2* | 11/2021 | Krishnan | G06F 11/2035 |
| 11,989,545 B2* | 5/2024 | Su | G06F 8/65 |
| 12,190,089 B2* | 1/2025 | Lv | G06F 8/61 |
| 2010/0005504 A1 | 1/2010 | Gottimukkala et al. | |
| 2016/0266888 A1 | 9/2016 | Nieves et al. | |
| 2018/0054354 A1 | 2/2018 | Wienstroer et al. | |
| 2019/0014015 A1* | 1/2019 | Patil | G06F 8/63 |
| 2019/0238358 A1* | 8/2019 | Hurewitz | H04L 12/4625 |
| 2019/0317750 A1 | 10/2019 | Ramsay et al. | |
| 2019/0319860 A1 | 10/2019 | Seed et al. | |
| 2020/0356354 A1* | 11/2020 | Mitra | G06F 16/903 |
| 2021/0405988 A1* | 12/2021 | Tahiri | G06F 9/5072 |
| 2022/0058523 A1 | 2/2022 | Falcon et al. | |

OTHER PUBLICATIONS

International Search Report and Written Opinion dated Sep. 6, 2023 for PCT Patent Application No. PCT/ IB2023/054804.

Notice of Allowance and Fees dated Mar. 13, 2024 for U.S. Appl. No. 17/663,112.

Office Action dated Nov. 24, 2023 for U.S. Appl. No. 17/663,112.

Splash Buddy Wiki Extras, https://github.com/macadmins/SplashBuddy/wiki/70---Extras, Accessed on Nov. 19, 2021, page last edited on Nov. 22, 2017, 8 pages.

Splash Buddy Wiki Presentation, https://github.com/macadmins/SplashBuddy/wiki/10---Presentation, Accessed on Nov. 19, 2021, page last edited on Aug. 23, 2017, 4 pages.

* cited by examiner

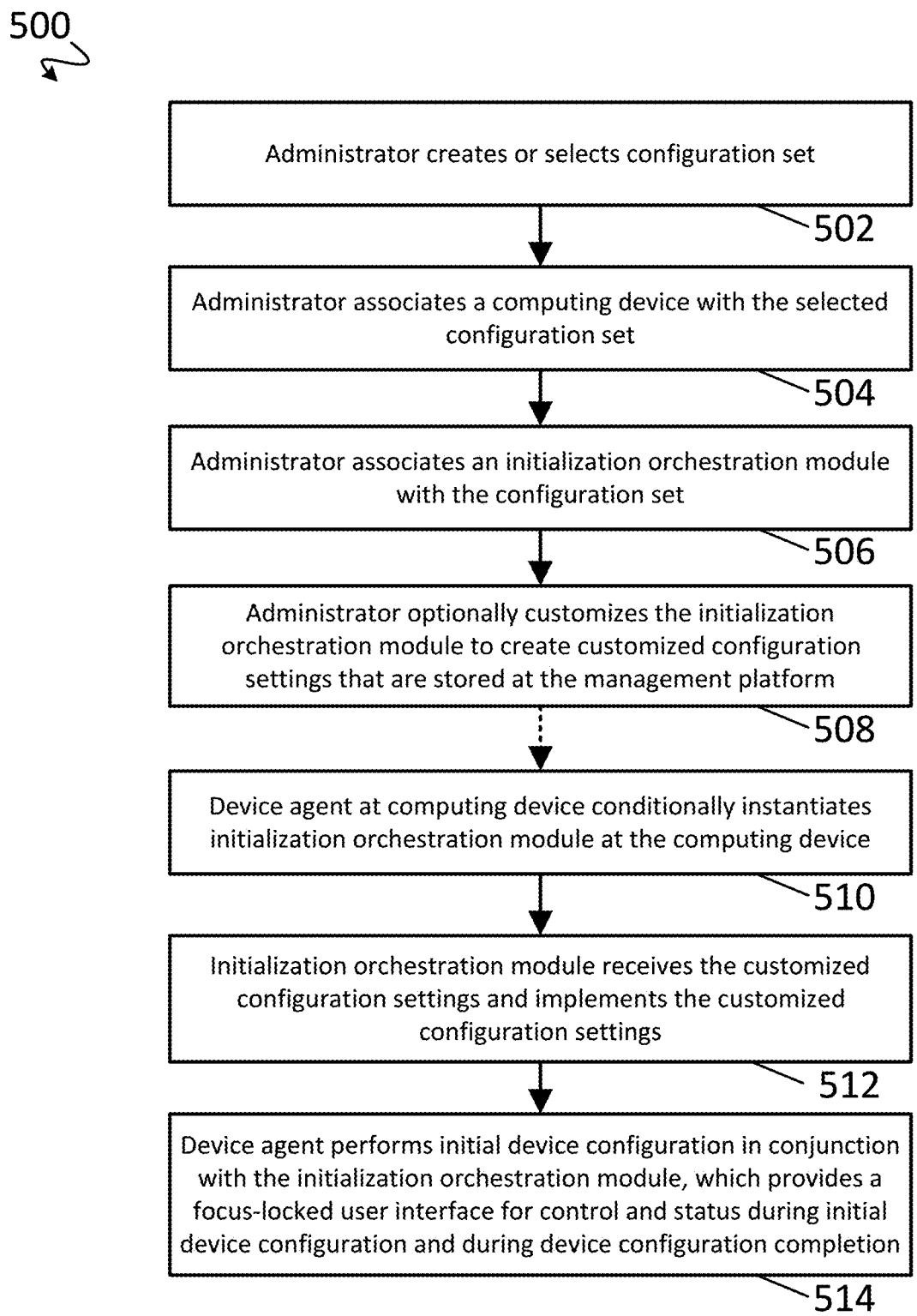

FIG. 6A

Initial Configuration Module — 601

Enabled — 602

Assignment

Blueprint: [HR Blueprint x] [Default Blueprint x] ▼ — 603

Initial Configuration Options Module — 604

Enrollment Trigger: [All Enrollements ▼] — 605

Logo: [Drop image here or upload] — 606

Display Mode:
- ● Window
- ○ Full Screen

— 607

Exit Password: [******]
Generate new password — 608

Customize Completion Tile  669

Icon

[gear icon] | Drop image here or upload  670

Title

Device Basics  671

Sub-title

Enter sub-title here  672

Button Text

Device Basics  673

Button URL https://help.yourdevice/yourdevicesos/#intro  674

675 Restore Defaults    676 Cancel    678 Done

600

CUSTOMIZABLE INITIALIZATION ORCHESTRATION MODULE PROVIDING A GRAPHICAL PREVIEW OF A GRAPHICAL STATUS SCREEN USER INTERFACE

RELATED APPLICATIONS

This application is a continuation of U.S. patent application Ser. No. 17/663,112, filed on May 12, 2022, which is hereby incorporated by reference in full.

BACKGROUND

New computing devices are frequently provided to employees within an enterprise (e.g., businesses or other organizations). Typically an operating system of a new computing device will guide a user through an initial basic configuration and setup procedure, but after completion of this basic configuration step the computing device may still not be ready for use within the enterprise. For example, for productive and compliant use within the enterprise, the computing device may still require a number of mandatory security configurations, network settings, device driver installations, application installations, and other updates that are typically not part of the initial basic configuration and may be specific to the enterprise. This process can be very time-consuming for administrators and IT technicians within the enterprise.

SUMMARY

In accordance with some embodiments, a method involves instantiating a device agent at a computing device. The device agent receives initialization orchestration module configuration data from a management platform operating at a server. The device agent instantiates an initialization orchestration module at the computing device in accordance with the initialization orchestration module configuration data. The device agent transmits the initialization orchestration module configuration data to the initialization orchestration module. The initialization orchestration module displays a graphical status screen user interface at the computing device in accordance with the initialization orchestration module configuration data. The initialization orchestration module directs the device agent to request a list of configuration items to be processed at the computing device from the management platform. The device agent receives the list of configuration items. The device agent transmits the list of configuration items to the initialization orchestration module. The device agent processes a first configuration item of the list of configuration items. The initialization orchestration module receives first status messages regarding the first configuration item from the device agent as the device agent processes the first configuration item. The initialization orchestration module displays a status of the first configuration item in accordance with the first status messages using the graphical status screen user interface.

In accordance with some embodiments, a method involves receiving, by a device agent at a computing device, initialization orchestration module configuration data from a management platform operating at a server. The device agent instantiates an initialization orchestration module at the computing device in accordance with the initialization orchestration module configuration data. The device agent transmits the initialization orchestration module configuration data to the initialization orchestration module. The initialization orchestration module displays a graphical status screen user interface at the computing device in accordance with the initialization orchestration module configuration data. The device agent processes a first configuration item of a list of configuration items. The initialization orchestration module receives first status messages from the device agent regarding the first configuration item as the device agent processes the first configuration item. The initialization orchestration module displays a status of the first configuration item in accordance with the first status messages using the graphical status screen user interface.

In accordance with some embodiments, a method involves generating, using a web-portal provided by a management platform operating at a server, initialization orchestration module configuration data using a graphical customization user interface. The graphical customization user interface provides a graphical preview of a graphical status screen user interface. An initialization orchestration module instantiated at a computing device displays the graphical status screen user interface in accordance with the initialization orchestration module configuration data. A device agent instantiated at the computing device processes a first configuration item of a list of configuration items. The initialization orchestration module using the graphical status screen user interface, displays a status of the first configuration item in accordance with first status messages regarding the first configuration item as the device agent processes the first configuration item.

In accordance with some embodiments, a method involves generating, using a web-portal provided by a management platform operating at a server, initialization orchestration module configuration data using a graphical customization user interface. The graphical customization user interface provides a graphical preview of a graphical status screen user interface. A device agent instantiated at a computing device transmits the initialization orchestration module configuration data to an initialization orchestration module instantiated at the computing device. The initialization orchestration module displays the graphical status screen user interface in accordance with the initialization orchestration module configuration data. The device agent processes a first configuration item of a list of configuration items. The device agent transmits first status messages to the initialization orchestration module regarding the first configuration item as the device agent processes the first configuration item. The initialization orchestration module using the graphical status screen user interface displays a status of the first configuration item in accordance with the first status messages.

BRIEF DESCRIPTION OF THE DRAWINGS

FIG. 5 shows a portion of a process for an initial configuration of a computing device of the network platform shown in FIG. 1, in accordance with some embodiments.

FIGS. 6A-6H show simplified portions of a user interface for customizing an initialization orchestration module, in accordance with some embodiments.

DETAILED DESCRIPTION

Figure 1:
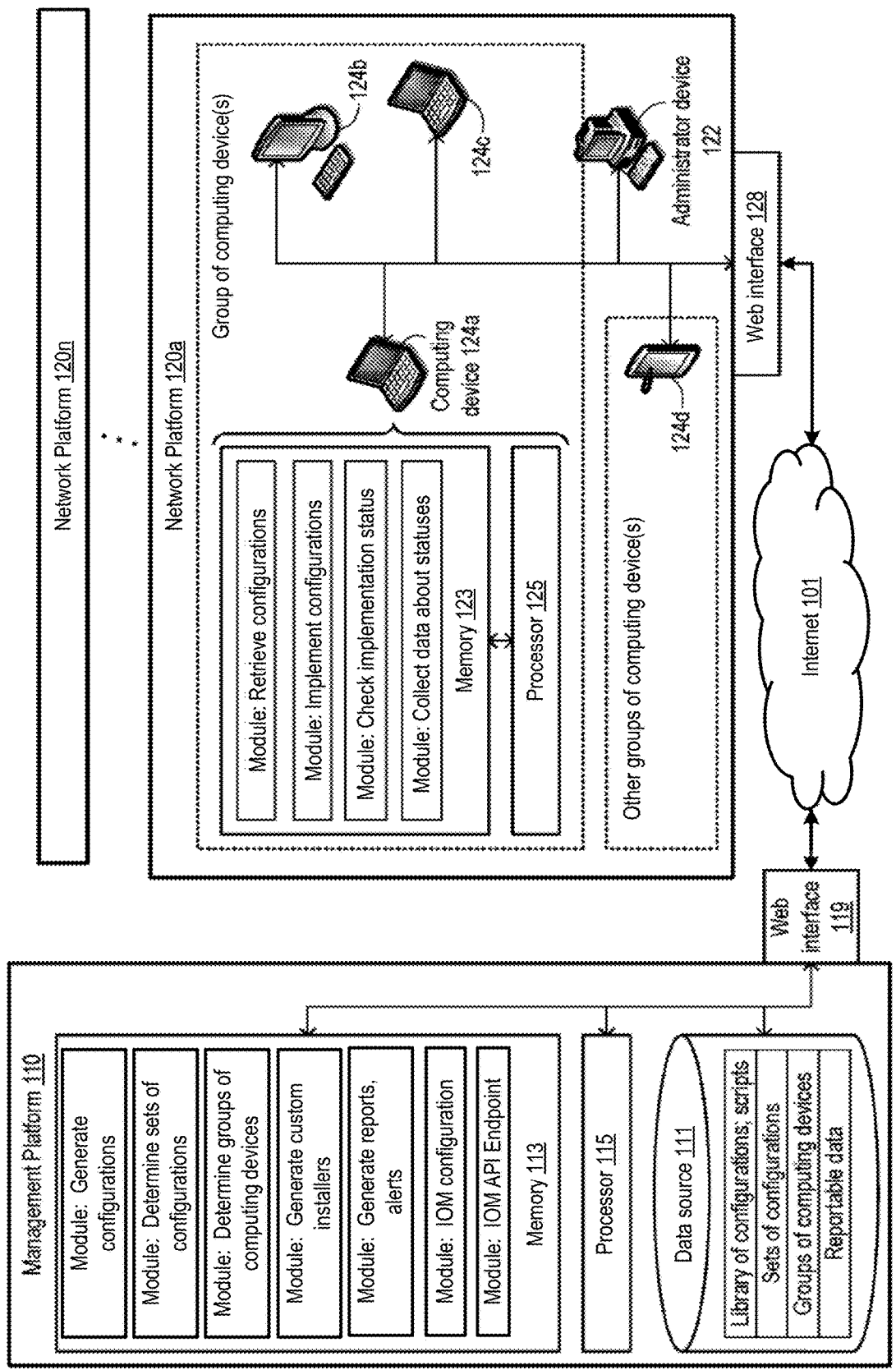
FIG. 1 shows an operational environment for initial configuration of a computing device, in accordance with some embodiments.

New computing devices are frequently provided to employees within an enterprise (e.g., businesses or other organizations). After completion of basic configuration steps provided by an operating system of the computing device, the computing device may still not be ready for use within the enterprise. Unfortunately, a user of the computing device is often ill-equipped to perform the necessary steps of initializing the computing device, in the necessary order, without detailed guidance. Additionally, until the computing device is configured with security settings required by the enterprise, the computing device may pose a security risk to a network of the enterprise.

Disclosed herein is an initialization orchestration module that advantageously orchestrates a user experience at a computing device by interacting with a device agent (e.g., a daemon) on the computing device as the device agent performs additional configuration steps, software application installations, updates, and/or other modifications to the computing device. During the initial configuration, the initialization orchestration module provides the user with a helpful user interface that shows a status for each configuration item and remediates certain errors that may occur during the initial configuration. The user interface also advantageously prevents a user from performing other tasks on the computing device until the initial configuration is complete by using focus-locked user interfaces, thereby reducing potential errors introduced by the user's activity and mitigating security risks caused by the use of the computing device before security settings and applications are configured. Focus-locked user interfaces are user interfaces that prevent a user from selecting or launching other software applications at a computing device or exiting the focus-locked user interface until permitted to do so.

Upon completion of the initial configuration, the user interface provides the user with informational resources so that the user might address any questions or concerns without burdening an administrator or IT technician.

Many aspects of the initialization orchestration module are advantageously customizable to enable an administrator to tailor the initial configuration experience to the needs of the enterprise. Such customization includes customizable text, graphics, and informational content provided to the user during the initial customization experience. Such customization is provided by graphical interfaces at a web-portal of a management platform that provide the administrator with a graphical preview of what the user will see during the initial configuration experience. As such, customizing an initialization orchestration module as disclosed herein is more efficient than prior art solutions that rely on configuration scripts or other text-based configurations. This is because such script or text-based configurations may require significant iterations for an administrator to see how each setting changes the user's experience. Furthermore, such script or text-based configurations may require a level of expertise or specialized knowledge from an administrator as compared to a graphical interface as disclosed herein.

Enterprises that consider developing and maintaining their own security and configuration software face many issues, including: significant costs; burden on finite IT resources that are unable to properly maintain security software; security breaches resulting from improper implementation of industry standards; and potential loss of institutional knowledge that is necessary for maintaining security software under circumstances when IT resources that built or maintained the software leave the enterprise. Even if security software could initially configure computing devices to comply with a set of security policies, ensuring compliance by those computing devices over time may not be possible given finite resources and other factors.

Improved systems and methods for implementing security policies of an enterprise on different computing devices and validating compliance with the security policies during regular intervals are described below. The improved systems and methods offer different advantages, including: simultaneous use by multiple enterprises to implement and monitor compliance of different security policies of those enterprises; easy and quick customization of different security policies for different computing devices within an enterprise; efficient implementation of security policies based on standards; ability to enforce any number of security policies for any number of computing device groups; easy modification of security policies over time; monitoring of compliance on an on-going basis; and real-time reporting of compliance.

Security policies in the improved systems and methods can be implemented using configurations that define particular behaviors of computing devices, where those behaviors are required by the security policies. For example, one configuration may require that a parameter be set on a computing device that ensures the placement of a Wi-Fi status indicator on a menu bar of an operating system's graphical user interface. Another configuration may require that a firewall is enabled on a computing device. Another configuration may require the activation of a screen saver on a computing device after a defined period of inactivity (e.g., 5 minutes).

The improved systems and methods utilize a data source for storing an expansive pre-built library of configurations, some of which can be customized with different values of variables. The pre-built library is updated as needed over time. Collections of configurations that are based on compliance standards are also determined and stored over time.

The improved systems and methods utilize a web-portal generated using a management platform for suggesting collections of configurations based on standardized security policies, enabling administrators of different enterprises to select configurations that represent security policies of interest to those enterprises, and to optionally select different sets of configurations for different policies that apply to different groups of computing devices, enabling administrators of different enterprises to select groups of computing devices that need to comply with particular sets of configurations, enabling administrators of different enterprises to edit sets of configurations and groups of computing devices over time as circumstances change, and providing, to administrators of different enterprises, generated reports detailing whether particular computing devices are complying with selected configurations or have not complied with particular configurations.

The improved systems and methods utilize a local device agent ("device agent" or "local agent") installed on each computing device for implementing selected configurations, checking compliance with current configurations over time, remediating non-compliance of particular configurations either automatically or by prompting manual action by an end-user of the non-compliant computing device, and reporting compliance status per configuration at regular intervals. The improved systems and methods store historical compliance statuses to track compliance over time.

Attention is initially drawn to an operational environment illustrated in FIG. 1 in which an initialization orchestration module may operate in accordance with some embodiments, as well as in which systems and methods for initial configuration of a computing device and deploying configurations on computing devices, and validating compliance with the configurations during scheduled intervals may operate. As shown in FIG. 1, the environment includes a management platform 110 in communication with one or more network platforms 120*a-n* via the internet 101 or another suitable communication pathway.

The management platform 110 provides many different functionalities, including: maintaining available configurations, and also maintaining collections of configurations that are based on security standards; receiving administrator selections of configurations that apply to identified groups of computing devices; providing device agents to the identified computing devices to register computing devices, and enabling implementation and remediation of configurations; providing selected configurations and any modules needed to implement the configurations to computing devices; generating reports that detail compliance statuses of computing devices, and creating, storing and providing initialization orchestration module (IOM) configuration data.

The management platform 110 includes one or more data sources 111 that store different data that is used during methods for determining sets of configurations associated with groups of computing devices (FIG. 2), methods for implementing a set of configurations on a computing device and validating compliance with the configurations during scheduled intervals (FIG. 3), as well as methods for configuring an initial configuration of a computing device using an initialization orchestration module (FIG. 5 through FIG. 10). As shown, the data stored in the data sources 111 specifies or represents a library of separate configurations or collections of configurations (including initialization orchestration module configuration data), sets of configurations selected by administrators of network platforms 120*a-n*, groups of computing devices selected by administrators of network platforms 120*a-n*, and reportable data that is determined from data reported by groups of computing devices. Individual, pre-built scripts for implementing individual configurations are also stored in the data source 111.

The management platform 110 also includes memory 113 for storing computer software instructions—e.g., different software modules—that are used to carry out different aspects of methods for determining sets of configurations associated with groups of computing devices (FIG. 2) and for implementing a set of configurations on a computing device and validating compliance with the configurations during scheduled intervals (FIG. 3), as well as for configuring an initial configuration of a computing device using an initialization orchestration module (FIG. 5 through FIG. 10). Examples of modules include: module(s) for generating configurations (e.g., see step 201 of FIG. 2); module(s) for determining sets of configurations (e.g., see steps 203 through 211 of FIG. 2); module(s) for determining groups of computing devices (e.g., see steps 213 through 221 of FIG. 2); module(s) for generating installers of device agents (e.g., see step 223 of FIG. 2); module(s) for generating reports and alerts (e.g., see step 347 of FIG. 3), modules for configuring and customizing an initialization orchestration module (IOM) (e.g., by providing a user interface using a web-portal) to generate initialization orchestration module configuration data (e.g., see steps 506 and 508 of FIG. 5), and modules for providing a dedicated initialization orchestration module (IOM) application programming interface (API) endpoint to provide initialization orchestration module configuration data (e.g., see step 708 of FIG. 7). Other modules associated with other steps performed by the management platform during the processes of FIG. 2, FIG. 3, FIG. 5, FIG. 7, FIG. 8, FIG. 9, and FIG. 10 are also contemplated even if not shown in FIG. 1. Details of each module will become more apparent during the discussion of process steps described below, which may be implemented by executing instructions of different modules.

The management platform 110 also includes one or more processors 115 for executing computer software instructions. Examples of processors include servers or other suitable machines.

A web interface 119 ("web-portal") can also be used by the management platform 110 to enable communication with the network platforms 120*a-n* via the internet 101. Connections among the components of the management platform 110 may be provided using any suitable wired or wireless communication pathways.

A network platform 120 includes a network of an enterprise on which different computing devices 124 operate. A network platform 120 can include a single location or multiple different locations from which different computing devices 124 have access to network resources of the network platform 120 (e.g., databases, a local area network, email servers, etc.), where access to different network resources requires the computing devices 124 to behave in particular ways (e.g., be configured with particular parameters). By way of example, the network platform 120*a* may include an administrator device 122 operated by an administrator and/or IT technician, and one or more computing devices 124 that are operated by one or more users. A web interface 128 can also be used by the network platform 120*a* to enable communication with the management platform 110 via the internet 101.

The administrator device 122 includes a computing device operated by an administrator and/or IT technician of the network platform 120*a*. Functions of the administrator device 122 are further described in FIG. 2 and FIG. 3 and include using a web-based portal to select sets of configurations to apply to groups of computing devices within the network platform 120*a*, and also using a web-based portal to review reports detailing configuration compliance status at each computing device to which configurations apply. The administrator device 122 is also operable to use a web-based portal to provide an administrator with a graphical display for configuring and customizing an initialization orchestration module that will operate at one or more of the computing devices 124.

The computing devices 124 may each include memory 123 for storing computer software instructions—e.g., different software modules—that are used to carry out different aspects of a method for implementing a set of configurations on a computing device and validating compliance with the configurations during scheduled intervals (FIG. 3) as well as implementing an initialization orchestration module. Examples of modules include: module(s) for retrieving configurations (e.g., see step 329 of FIG. 3); module(s) for implementing configurations (e.g., see step 339 of FIG. 3); module(s) for checking implementation statuses (e.g., see step 337 of FIG. 3); and module(s) for collecting data about statuses (e.g., see step 341 of FIG. 3). The functionality of these modules can be performed by a device agent that is installed on the computing devices. Additional modules of the computing devices 124 are shown and described with reference to FIG. 4. Other modules associated with other steps performed by the computing device during the processes disclosed herein are also contemplated even if not shown in FIG. 1.

Each of the computing devices 124 may include one or more processors 125 for executing computer instructions of the modules, data sources (not shown) for storing the collected data, user interfaces (not shown) for allowing a user to provide inputs and receive outputs, and means for communicating with the management platform 110 (e.g., the web interface 128 of the network platform 120a, or another interface of the computing device 124a). Additional details of an example computing device are described below with reference to FIG. 4.

Connections among the components of each computing device may be provided using any suitable wired or wireless communication pathways. Connections among the devices of each network platform may be provided using any suitable wired or wireless communication pathways.

Details about different methods involved in deploying configurations on computing devices and validating compliance with the configurations during scheduled intervals are provided below with reference to FIG. 2 and FIG. 3.

Figure 2:
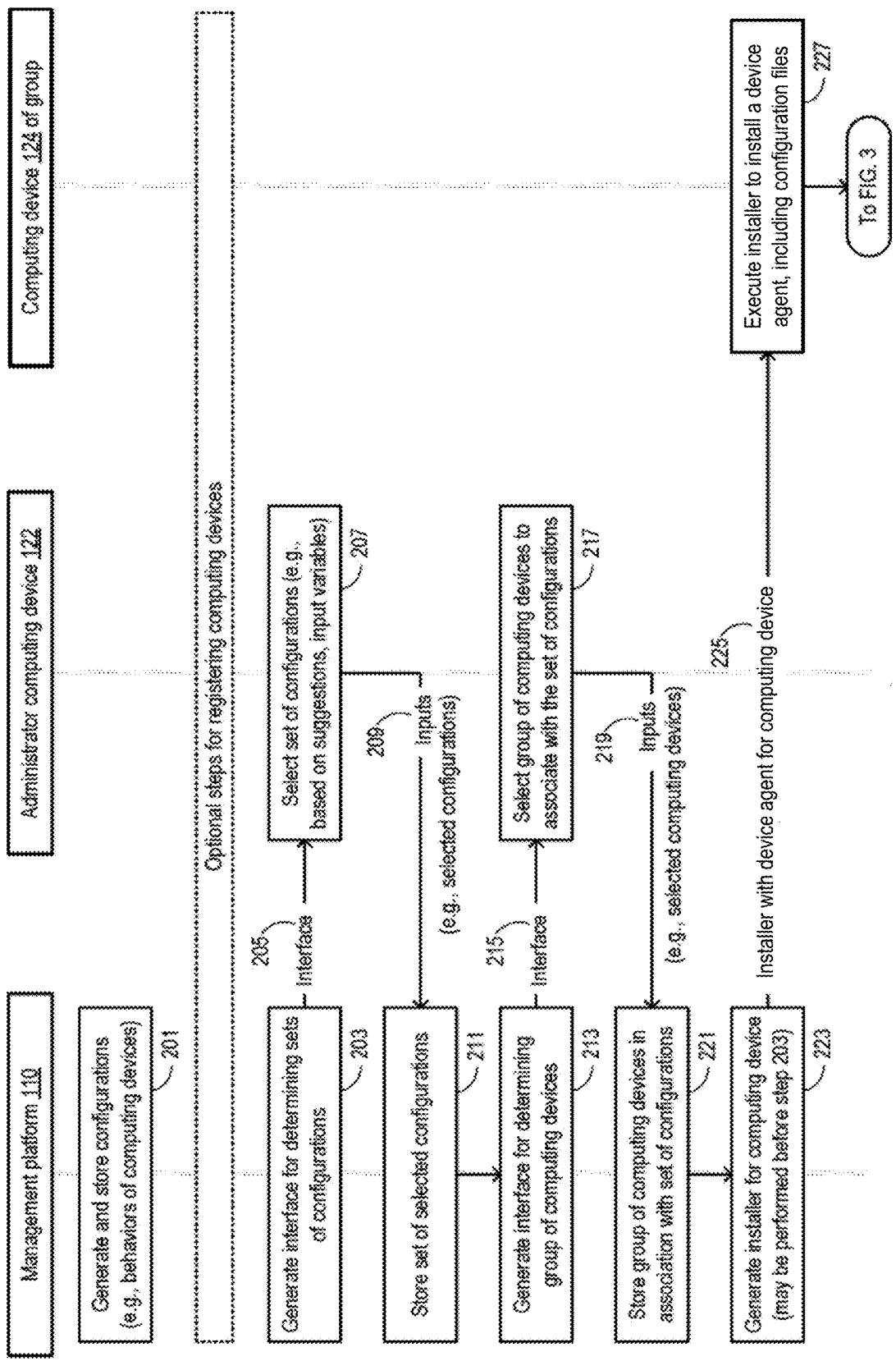
FIG. 2 shows a process for determining sets of configurations to associate with groups of computing devices, in accordance with some embodiments.

A process for determining sets of configurations to associate with groups of computing devices is shown in FIG. 2.

The management platform 110 generates and stores configurations (step 201). Configurations may be defined by preset parameters or adjustable variable parameters that control the behaviors of computing devices. For each configuration, a description of the behavior controlled by the parameters of that configuration may be stored for later viewing and optional selection by an operator of an administrator device 122.

In some embodiments, for each configuration, the management platform 110 stores computer code (e.g., modules) that can be executed by a device agent of a computing device to implement that configuration (e.g., by setting parameters on the computing device that achieve particular behaviors of the configuration). In one embodiment, the code for a configuration is generated manually by a user, and then stored in association with stored information about that configuration (e.g., details about the configuration, including any description and parameters for carrying out the configuration). An identifier of the configuration may be used to make the association.

Optionally, collections of configurations that comply with particular compliance security standards (e.g., CIS, FedRamp, HIPAA, HiTrust, ISO, NIST, DISA, STIG, or others) can be determined.

Determining a configuration or a collection of configurations can be a manual process performed by someone who generates configurations or creates collections of configurations by evaluating a benchmark of standards published by various agencies (CIS, NIST, DISA STIG, etc.) and creates sets of configuration(s) that are needed to meet the benchmark.

Different possible configurations are provided in a "Configurations" section near the end of this disclosure. By way of illustration, a configuration may include parameters that specify: a Wi-Fi status indicator must be placed on a menu bar of an operating system's graphical user interface; a firewall is enabled; a screen saver must be activated within a defined period of time after inactivity (e.g., 5 minutes); passwords used to access the computing device must have particular characteristics (e.g., minimum length, may use particular types of characters, cannot use particular types of characters); only a defined number of login attempts are permitted; and any other possible settings to a computing device.

Configurations may also include a listing of one or more applications to be installed at a computing device (e.g., a productivity suite for a new employee), and scripts to be executed. Configurations may also provide blacklisting functions, where applications or processes are selectable by name, identifier, path, or code signature, and those applications or processes are terminated upon launch of a computing device on which the configurations are implemented. A UI window for providing details of the blacklisting policy to a user of the computing device can also be activated, which can include a custom configured message and/or button for opening a URL.

After different configurations are determined and stored, the management platform 110 generates an interface (e.g., a web-portal) that allows different administrator devices of different network platforms to determine (e.g., select) one or more sets of configurations that will respectively be applied to one or more different groups of computing devices (step 203). The interface is provided by the management platform 110 to the administrator device 122 of the network platform 120 (step 205).

Using the interface, an operator ("administrator") of the administrator device 122 selects a set of configurations (step 207). Selection of a particular configuration may be carried out by way of providing an input that identifies desired use of the configuration—e.g., selecting an option to activate the configuration, such as keeping a toggle at an "on" state or moving a toggle to an "on" state. Deselection of a particular configuration may be carried out by way of providing an input that identifies that the use of the configuration is not desired—e.g., selecting an option to deactivate the configuration, such as keeping a toggle at an "off" state or moving a toggle to an "off" state. While selecting configurations to include in a set, certain selected configurations may require initialization of or allow for adjustment to variables of those configurations (e.g., lengths of time associated with functionality of the configurations, or other options affecting how configurations run on computing devices).

In one embodiment of step 207, the operator of the administrator device 122 is presented with a predefined collection of configurations, and selects particular configurations by keeping a toggle at an "on" state for those configurations of the predefined collection, and moving a toggle to an "off" state for non-selected configurations of the predefined collection. Predefined collections may come in different forms, including collections of suggested configurations for complying with different compliance security standards, and the operator can select a particular collection for a particular standard from among other collections for other standards via a display presented by the web-portal.

In another embodiment of step 207, the operator of the administrator device 122 selects a previously created set of configurations, and then edits that set by adding or removing configurations from the set, or by modifying values of adjustable variables for particular configurations before saving an updated version that set that includes the modifications.

In other embodiments of step 207, the operator of the administrator device 122 may select configurations using other approaches—e.g., searching for particular configurations.

Through the web-portal, selections of configurations and any values of initialized or modified variables for particular configurations are transmitted from the administrator device 122 to the management platform 110 (step 209).

The management platform 110 stores identifiers of received sets of configurations and values of variables (step 211). Any user-created code may also be stored. In one embodiment, identifiers of selected configurations and any values of variables are stored by the management platform 110 to represent the set. In another embodiment, the actual configurations are stored as a set. However, storage of identifiers is more efficient in terms of minimizing the use of limited storage capacity at the management platform 110. A name of the set may also be defined by the operator of the administrator device 122 and stored along with the set.

The management platform 110 generates an interface (e.g., web-portal) that allows the administrator device 122 of the network platform 120 to determine groups of computing devices to which a set of configurations will apply (step 213). The interface is provided by the management platform 110 to the administrator device 122 of the network platform 120 (step 215).

Using the interface, an operator of the administrator device 122 selects computing devices for inclusion in a group of computing devices (step 217). An existing group can be selected and modified to add or remove a computing device. Prior to step 217, different computing devices of a network platform 120 are registered ("enrolled") with the management platform 110 so they can be selected by the operator of the administrator device 122 of that network platform 120 (e.g., selected by device name or another unique identifier). Registration can be carried out in different ways.

In one embodiment, an installer with an agent that is associated with the network platform 120 is installed on computing devices of that network platform 120. A package generation script is used by the management platform 110, which generates and sends a request to build a new package with configuration options that identify where to store the installer file (e.g., a directory owned by the company of a network platform 120) and a unique key that is later used to identify and register a computing device that receives the installer. Installation of the agent associates a computing device with the network platform 120, and the agent transmits a unique identifier from the computing device (e.g., name of the computing device, serial number, UUID, other) to the management platform 110. That unique identifier can be selected by the operator of the administrator device 122 and added to a group of computing devices to which a set of configurations will apply. The agent may be a unique agent for the purpose of registering a computing device. Alternatively, the agent may be the same device agent of steps 223-227, such that steps 223-227 occur before steps 213-221 and optionally before steps 203-211.

In another embodiment, steps 213-221 are not performed, and the operator of the administrator device 122 selects an option to create the installer of step 223, and then identifies individual computing devices to which that installer is transmitted. During the installation process of step 227, a unique identifier is transmitted for the computing device (e.g., name of the device, serial number, UUID, other) to the management platform 110 to register, or enroll, the computing device in association with a network platform 120 of the administrator device 122.

During registration, or enrollment, in some embodiments, other information associated with a computing device is collected, including users of the device, processors, RAM, hard drives, boot information, device information, and/or OS version. When collected, this information is stored in association with the unique identifier of the computing device. All unique identifiers of computing devices of a network platform 120 have a stored association with an identifier of that network platform 120.

Through the web-portal, selections of computing devices to include in a group are transmitted from the administrator device 122 to the management platform 110 (step 219).

The management platform 110 stores the group of selected computing devices (step 221)—e.g., by storing the unique identifiers of the selected computing devices in association with the selected set of configurations.

In different embodiments, steps 213 through 221 can be performed before or after steps 203 through 211. In one embodiment, an option to select a group of computing devices to associate with a set of configurations is provided via the web-portal—e.g., the operator of the administrator device 122 is provided with an option to "view all" computing devices and/or all preset groups of computing devices of the network platform 120, and then select from the list.

After a group of computing devices has been determined and associated with a set of configurations, the management platform 110 generates an installer for each computing device of a group (step 223). The installer includes an executable file that is configured to install a device agent on the computing device for which the custom installer has been created. In some embodiments (discussed previously), this step is performed prior to steps 213-221 and optionally steps 203-211 (i.e., when a computing device joins the network platform 120, or when the network platform 120 initially engages with the management platform 110).

Each installer for each computing device of the group is transmitted from the management platform 110 to the particular computing device 124 (step 225). Alternatively, an installer may be provided by the management platform 110 to the administrator device 122, and the administrator device 122 provides the installer to selected computing devices 124. Transmission of the installer can be manually driven by a user of the computing device 124 or the operator of the administrator device 122.

Figure 3:
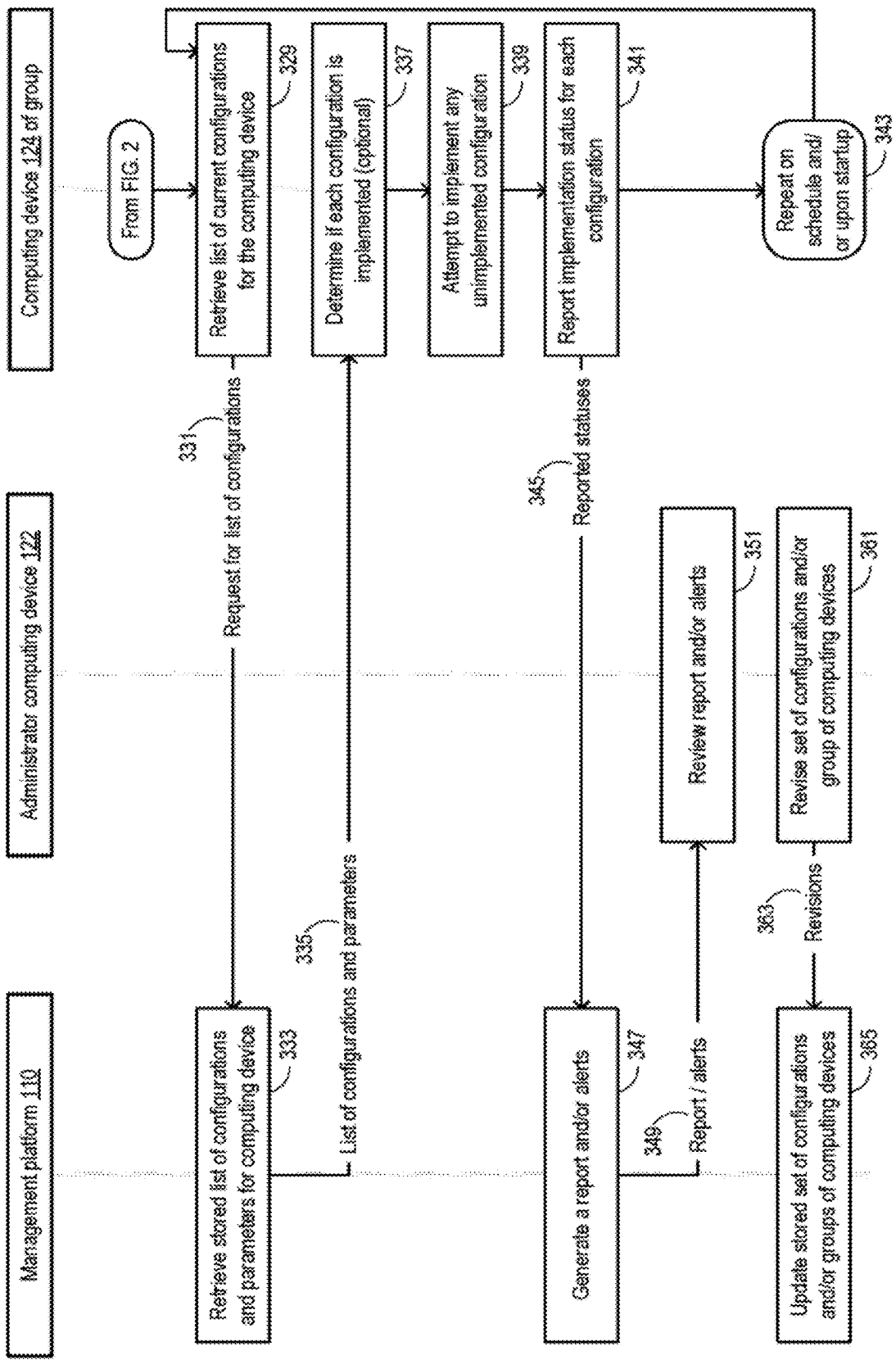
FIG. 3 shows a process for implementing a set of configurations on a computing device and validating compliance with the configurations during scheduled intervals, in accordance with some embodiments.

After downloading the installer, the particular computing device 124 runs the installer to install a device agent (step 227) that is used to carry out a process shown in FIG. 3 for implementing a set of configurations on the computing device 124 and for validating the computing device's compliance with the configurations during scheduled intervals. The device agent includes different executable modules for different possible configurations, and different logical instructions for implementing a configuration based on different operating systems and versions of operating systems, such that a first set of logical instructions for implementing a particular configuration will be selected by the device agent running on a first computing device with a first operating system (or a first version of an operating system), and a second set of logical instructions for implementing the particular configuration will be selected by the device agent running on a second computing device with a second operating system (or a second version of the operating system). In one embodiment, the same device agent and executable modules are installed on every computing device of the selected group of computing devices, and the executable modules include modules for a superset of possible configurations that may include more configurations than are selected for the group of computing devices. In another embodiment, the same device agent and executable modules are installed on every computing device from two or more groups of computing devices (e.g. from the same network platform or different network platforms), and the executable modules include modules for a superset of possible configurations that may include more configurations than are selected for each of the groups.

In an alternative embodiment, another step before step 223 is performed, where a user of a computing device receives a notification that the computing device has been assigned to a set of configurations, after which the user then initiates a download of a specific installer (alternative step 223) that includes a device agent with modules for the set of configurations assigned to that computing device. The device agent need not include modules for implementing a superset of configurations. Instead, only modules for implementing configurations of the set assigned to the computing device are included. If new configurations are added to the set, then modules for implementing those new configurations are sent to the computing device. In one embodiment, each computing device of a group receives modules with only the logical instructions needed for implementing configurations based on the operating system and/or version of the operating system of that computing device, and without logical instructions for implementing configurations based on other operating systems and/or other versions of the operating system.

A process for implementing a set of configurations on a computing device and validating compliance with the configurations during scheduled intervals is shown in FIG. 3. A device agent installed on a computing device 124 may be used to perform steps of this process that are carried out on the computing device 124.

The computing device 124 retrieves identifiers of current configurations assigned to that computing device (step 329)—e.g., a set of configurations associated with a group of computing devices to which the computing device 124 belongs. During step 329, the device agent installed on the computing device 124 generates a request that contains information used by the management platform 110 to locate and retrieve identifiers of configurations for the set of configurations assigned to the computing device 124. The information may take different forms. In one embodiment, each computing device uses a unique key to authenticate to a webapp API of the management platform 110. This computer-specific key is also used to identify which computing device is making the request, and the identity of the computing device is used to identify the configuration group to which that computing device belongs. The device agent calls a parameters API endpoint using its unique key to authenticate the request, and the management platform 110 (e.g., webapp) determines what data to send based upon the authentication. Likewise, when the device agent submits data back to the management platform 110 (e.g., webapp), the key is used to determine the device to which the data belongs.

The request for current configurations is transmitted from the computing device 124 to the management platform 110 (step 331).

After receiving the request, the management platform 110 retrieves stored identifiers of the set of configurations for the computing device 124 (step 333). The management platform 110 uses the information of the request to locate, from storage, identifiers for the current set of configurations for the computing device (e.g., for the group of computing devices in which the computing device is a member). Particular values of variables for particular configurations of the current set of configurations are also retrieved from storage where those variables are stored in association with the identifiers (e.g., nested in an object of the identifier). Values of variables can be text, integers, Boolean true/false values as single items, values, lists, dictionaries, or other data. The identifiers will be returned by the management platform 110 to the device agent of the computing device 124, and the device agent can use the identifiers to select modules of associated configurations for execution using the variable values.

The retrieved identifiers of the set of configurations for the computing device 124 are transmitted (step 335) from the management platform 110. Any retrieved values of variables for the set of configurations are also transmitted from the management platform 110 to the computing device 124. In some embodiments, modules for any newly created configurations are also transmitted from the management platform 110 to the computing device 124 for installation with the device agent.

The computing device 124 stores and uses received configuration identifiers and any variable values to determine if each configuration in the set of configurations is implemented properly (step 337). In some embodiments, an initial check if a selected configuration is already implemented is made (e.g., by checking if a received value of a variable for that configuration is already set, by checking if the functionality of the computing device complies with the configuration, or other approaches). Instructions that perform this check may be included in each module for each configuration, or in a separate module of the device agent. In one embodiment, received parameters for identified configurations are compared to implemented parameters of the configurations to determine if there is a mismatch, and determinations are made that (i) a configuration is implemented when there is no mismatch for that configuration, or (ii) a configuration is not implemented when there is a mismatch for that configuration. In other embodiments, no check is made, and all configurations are implemented.

If the set of configurations is being implemented for the first time, then step 337 may be skipped in some embodiments.

In some embodiments, the device agent retrieves and stores the OS version, computer model, and serial number for the computing device 124 after the device agent is installed on the computing device 124. The agent uses information like OS version for selecting conditional logic and to determine compatibility with parameters of selected configurations.

The device agent of the computing device 124 attempts to implement any unimplemented configuration (step 339). Identifiers of configurations returned by the management platform 110 to the device agent of the computing device 124 are used by the device agent to select modules associated with those configurations to implement (e.g., the agent may associate identifiers with functions, chains of functions, class objects, etc.). If different logical instructions for different operating systems or versions of an operating system exist for a selected module, the device agent of the computing device 124 will access available information about the operating system and/or version of the computing device 124, and then select logical instructions for that operating system and/or version. When executing each configuration's module and any logical instructions (if they exist), any existing variable values associated with that configuration are used to set the functionality of the computing device 124 so it complies with the configuration. As mentioned with optional step 337, an initial check to determine if a selected configuration is already implemented can be performed in some embodiments. If the configuration is not yet implemented, then instructions from the module for that configuration are executed to implement the configuration on the computing device 124. After the implementation ("processing") of configurations, a restart of the computing device 124 is performed if needed. In some cases, configurations are able to use native frameworks directly without needing to touch anything in a filesystem of the computing device 124.

Although not shown in FIG. 3, some embodiments monitor filesystem events on the computing device 124 using the device agent, which checks all of the files for the device agent against a database of known-good checksums to determine if any device agent files are missing (e.g., have been moved or deleted) or modified. If there is a mismatch (e.g., a file is missing or modified), the device agent downloads and reinstalls the missing or modified files to restore them to their intended state. The process of monitoring filesystem events may occur at different times, including before step 329 or any time thereafter. A missing or modified file may be downloaded when the device agent generates a request for a file containing the module, sends the request to the management platform 110, receives the requested file from the management platform 110, and downloads the received file. Alternatively, backup files may be stored on the computing device 124 (e.g., in case the computing device 124 goes offline, or another reason), and the file may be retrieved from the backup files.

The device agent of the computing device 124 generates data specifying the statuses of configurations on the computing device 124 (step 341)—e.g., for each configuration, a status indicating whether that configuration is implemented or not. Optionally, the device agent may provide alerts about unimplemented statuses of configurations and prompt the user to implement the configurations when automatic implementation is not possible. Actions by users of computing devices can also be logged and transmitted to the management platform 110—e.g., a user attempts to use a blacklisted application or program, a user attempts to remove required configurations, or user attempts to modify required parameters of configurations.

By way of example, statuses may include: implemented; remediated (e.g., implemented after being not implemented); not implemented (error—e.g., no ability to apply the configuration to the computing device 124); not implemented (alert for user intervention—e.g., alert to manually implement the configuration was provided or scheduled to be provided to a user of the computing device 124). The device agent may, in some embodiments, collect other information about the computing device 124, such as connected hard drives, installed applications, configuration profiles, and user accounts (e.g., determined from a property list file on the computing device 124 if available).

The device agent of the computing device 124 returns to step 329 at regularly scheduled intervals (e.g., every 15 minutes), or after the computing device 124 is powered on (step 343). In one embodiment, the operator of the administrator device 122 is permitted to set the duration of the scheduled intervals via the web-portal, and the duration is stored for later retrieval by the device agent or is coded into the device agent.

Repeating steps 329 through 341 on a regular basis permits deployment of updates to the set of configurations, and/or ensures a computing device continually complies with the set of configurations over time under circumstances when the set of configurations remains unchanged over time or evolves over time. If the device agent is unable to retrieve configurations during steps 329 through 335, which may occur when the computing device 124 is offline or otherwise unable to connect to the management platform 110, then steps 337 through 343 are performed for the most recently retrieved configurations.

The statuses of configurations on the computing device 124 are transmitted to the management platform 110 (step 345). If the device agent is unable to transmit the statuses due to the computing device 124 being offline or otherwise unable to connect to the management platform 110, transmission occurs after the computing device 124 can connect to the management platform 110.

The management platform 110 stores the statuses in the data source 111, and then generates a report along with any alerts for viewing by the administrator device 122 via a web-portal (step 347). Generated reports along with any alerts are transmitted to the administrator device 122 (step 349), and an operator of the administrator device 122 views the reports and any alerts (step 351). Reports may include different details, including: an overall status for a computing device (e.g., all configurations implemented, some configurations not implemented); a status for individual configurations, including compliant and non-compliant statuses for particular computing devices; historical statuses for computing devices; indicators that a previously non-compliant status for a configuration was remediated to a compliant status for that configuration; or other desired features.

At any time (e.g., before or after any step of FIG. 3), an operator of the administrator device 122 can modify a set of configurations, and/or modify a group of computing devices associated with a set of configurations (step 361). Modification of a set of configurations may be performed by removing or adding a configuration, or by modifying values of variables for a configuration. Modification of a group of computing devices may be by removing or adding a computing device. Of course, sets of configurations and/or groups of computing devices can be deleted, and groups of computing devices or individual computing devices can be re-associated with other sets of configurations. Any modifications made by the operator are transmitted to the management platform 110 for storage (step 363), and the management platform 110 updates a stored set of configurations and/or groups of computing devices to reflect the modifications (step 365).

The device agent of the computing device 124 may optionally interact with the user of the computing device 124 in different ways, including: displaying an icon on the menu bar to indicate the device agent is installed and functioning; prompting the user to take action (e.g., to implement a configuration); requesting submission of diagnostic data for troubleshooting; or other interactions.

The steps for the computing device shown in FIG. 2 and FIG. 3 are repeated for different computing devices in groups of computing devices that are associated with different sets of configurations. The steps for the administrator device shown in FIG. 2 and FIG. 3 are repeated for different administrator devices of different network platforms.

In some embodiments, an initialization orchestration module advantageously interfaces with the device agent on a computing device as the device agent performs an initial configuration (e.g., for a new computing device) that may include applying configurations as described above, installing software application installations and updates, executing scripts, and making other modifications to the computing device. Additionally, in some embodiments, the initialization orchestration module is operable to interact with the device agent to install and track software applications via mobile-device-management protocols in addition to via vendor-provided installation packages.

During the initial configuration, the initialization orchestration module provides the user with a helpful user interface that shows a status for each item that is processed and remediates certain errors that may occur during the initial configuration. The initialization orchestration module additionally creates a focus-locked user interface to prevent the user of the computing device from performing most actions at the computing device until the initial configurations are complete. The initialization orchestration module also provides the user with resources at the end of the initialization process so that the user can find answers or guidance without burdening an administrator or IT technician.

Figure 4:
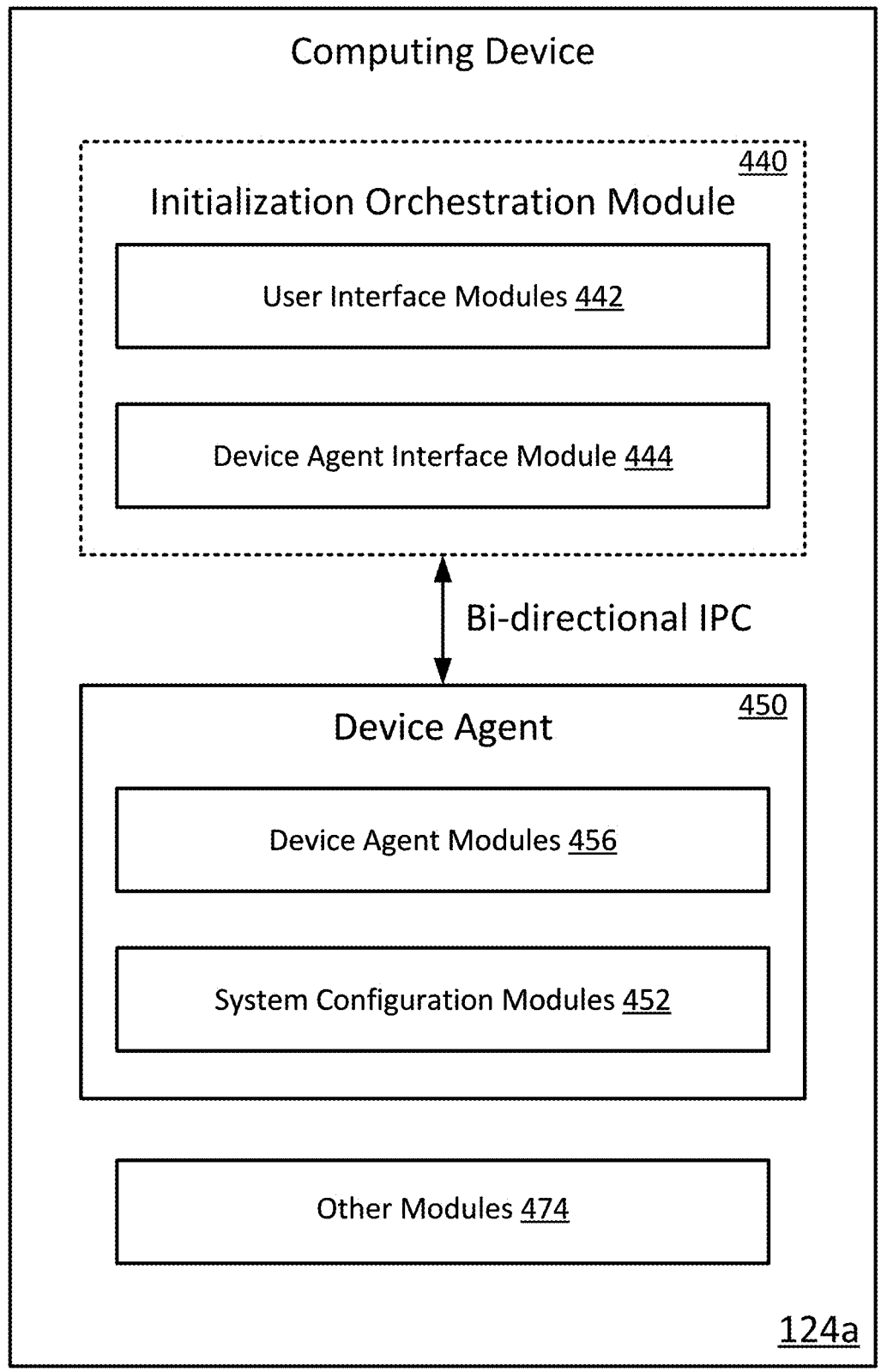
FIG. 4 shows a simplified representation of a computing device of the network platform shown in FIG. 1, in accordance with some embodiments.

FIG. 4 shows a simplified example of the computing device 124a of the network platform 120a shown in FIG. 1, in accordance with some embodiments. In addition to the modules shown and discussed with reference to FIG. 1, in general, the computing device 124a includes an initialization orchestration module 440 and a device agent 450 that communicate with each other via bi-directional inter-process communication protocols at the computing device 124a. In general, the initialization orchestration module 440 includes user interface modules 442 and device agent interface modules 444. The device agent 450 generally includes device agent modules 456 and system configuration modules 452. The device agent modules 456 include the modules of the computing device 124a described with reference to FIG. 1, as well as modules for communication with the initialization orchestration module 440. In some embodiments, the user interface modules 442, the device agent interface modules 444, the device agent modules 456, and the system configuration modules 452 work in conjunction to perform all or a portion of the steps of processes 500, 700, 800, 900 and/or 1000, described below.

The computing device 124a also includes other modules 474. The other modules 474 may include, among others, modules that are related to the operating system installed and running at the computing device 124a, as well as modules that are related to software applications that are installed at the computing device 124a. As described above with reference to step 227 of FIG. 2, in some embodiments, the device agent 450 is installed at the computing device 124a by an installer provided by the management platform 110. In other embodiments, the device agent 450 is installed, or is caused to be installed, at the computing device 124a as part of a factory setup, pre-shipping setup, or re-seller setup process of the computing device 124a. The device agent 450 is operable to receive and implement configurations as specified using the management platform 110, as described above.

The device agent 450 conditionally instantiates the initialization orchestration module 440 at the computing device 124a, but is later advantageously directed at times by the initialization orchestration module to remediate errors and to simplify user interactions with the computing 124a.

FIG. 5 provides a portion of a process 500 for a customized initial configuration of a computing device, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 502, an administrator creates or selects a configuration set using a web-portal of the management platform 110 as described above. At step 504, the administrator associates one or more computing devices with the configuration set using the web-portal of the management platform 110, as described above. At step 506, the administrator associates a customizable initialization orchestration module with the selected configuration set using a graphical interface of a web-portal of the management platform 110. In some embodiments, the customizable initialization orchestration module may be shared by many configuration sets, but each configuration set may only be associated with one initialization orchestration module configuration.

At step 508, the administrator may optionally customize the initialization orchestration module using a graphical interface of a web-portal of the management platform 110 to generate customized configuration settings and store the customized configuration settings at the management platform 110, details of which are described below.

At step 510, the device agent at the computing device (e.g., the computing device 124a) conditionally instantiates the initialization orchestration module at that computing device. An instantiated module or application is a module or application that has been provisioned, installed, executed, enabled, or has otherwise been caused to be running at a computing device. In some embodiments, the newly instantiated initialization orchestration module is configured with only default configuration settings.

At step 512, the initialization orchestration module retrieves the customized configuration settings from the management platform 110 (via the device agent, as described below) and implements the customized configuration settings. At step 514, the device agent performs an initial device configuration of the computing device in conjunction with the initialization orchestration module which provides a conditionally focus-locked user interface for control and status of the initial device configuration during the initial configuration, as well as during device configuration completion (e.g., a wrap-up step).

FIG. 6A shows a first portion of a simplified example user interface 600 for customizing the initialization orchestration module as part of steps 506 and 508 of the process 500, in accordance with some embodiments. In some embodiments, the example user interface 600 ("a graphical customization user interface") is presented to an operator ("administrator") of the administrator device 122 via a web-interface, or "web-portal" of the management platform 110. Configuration and customization choices made by the administrator using the user interface 600 at the administrator device 122 are transmitted from the administrator device 122 to the management platform 110, where they are stored.

An initial configuration module 601 includes an operating interface 602 and an assignment interface 603. The operating interface 602 enables an administrator to enable or disable the initialization orchestration module entirely. As described below, if the initialization orchestration module is enabled via the operating interface 602, then the device agent will conditionally cause the initialization orchestration module to be instantiated at the computing device when a configurable triggering event occurs. Likewise, if the initialization orchestration module is disabled via the operating interface 602, then the device agent will not cause the initialization orchestration module to be instantiated at the computing device.

The assignment interface 603 enables an administrator to associate the initialization orchestration module with one or more configuration sets ("Blueprints"), as described with reference to step 504 of the process 500.

An initial configuration module 604 includes an enrollment trigger interface 605, a logo interface 606, a display mode interface 607, and an exit password interface 608. The enrollment trigger interface 605 enables an administrator to select what event will trigger instantiation of the initialization orchestration module by the device agent at the computing device. In some embodiments, the set of selectable triggers includes "All Enrollments", "Automated Device Enrollment Only", and "Manual Device Enrollment Only". If All Enrollments is selected via the enrollment trigger interface 605, the initialization orchestration module will be instantiated by the device agent at the computing device regardless of an enrollment type selected by or for the operating system of the computing device. If Automated Device Enrollment Only is selected via the enrollment trigger interface 605, the initialization orchestration module will be only instantiated by the device agent at the computing device if automated device enrollment has been selected by or for the operating system of the computing device. If Manual Device Enrollment Only is selected via the enrollment trigger interface 605, the initialization orchestration module will be only instantiated by the device agent at the computing device if manual device enrollment has been selected by or for the operating system of the computing device.

In some embodiments, the device agent conditionally instantiates the initialization orchestration module immediately after a default setup assistant at the computing device has completed (e.g., as provided by the operating system of the computing device) and a user is logged into the computing device. If the enrollment trigger is set to Manual Device Enrollment Only or Automated Device Enrollment Only via the enrollment trigger interface 605, the device agent will evaluate what enrollment type has been selected by or for the computing device's operating system. If the enrollment types do not match, the device agent will not instantiate the initialization orchestration module. By contrast, if the enrollment types do match, the device agent will conditionally instantiate the initialization orchestration module. If All Enrollments was selected via the enrollment trigger interface 605, the enrollment type selected for the computing device will not be evaluated and the device agent will conditionally instantiate the initialization orchestration module regardless of which enrollment type has been selected for, or by, the computing device's operating system.

The logo interface 606 enables the administrator to select or upload a graphical object that will appear in the initialization orchestration module user interface. If no graphical object is selected or uploaded via the logo interface 606, no custom graphical object, or a default graphical object, will appear in the initialization orchestration module user interface.

The display mode interface 607 enables the administrator to select either a "Full Screen" or "Window" display mode for the initialization orchestration module user interface. If Full-Screen display mode is selected via the interface 607, the initialization orchestration module will be presented in a focus-locked full-screen mode at the computing device and the user will be prevented from using most functionality of the computing device, with the exception of the initialization orchestration module, until the initialization orchestration module completes operation. As described below, the user may optionally exit the focus-locked full-screen mode if a valid password is provided. If the Window display mode is selected, the initialization orchestration module will be presented in a window that is smaller than full-screen, but the initialization orchestration module will remain focus-locked until the initialization orchestration module completes its operation. However, the user may optionally advantageously exit the focus-locked window mode if a valid password is provided, as described below.

The exit password interface 608 enables the administrator to assign a password that will allow a user to optionally exit either the focus-locked full-screen mode or focus-locked window mode after the initialization orchestration module has been instantiated at the computing device and before the initialization orchestration module completes operation. The exit password advantageously allows for troubleshooting at the computing device if the initialization orchestration module is not operating as intended. In some embodiments, a prompt to enter the exit password at the computing device is hidden and is only shown upon entry, at the computing device, of a predetermined key sequence (e.g., Shift-K-J-D).

Figure 6B:
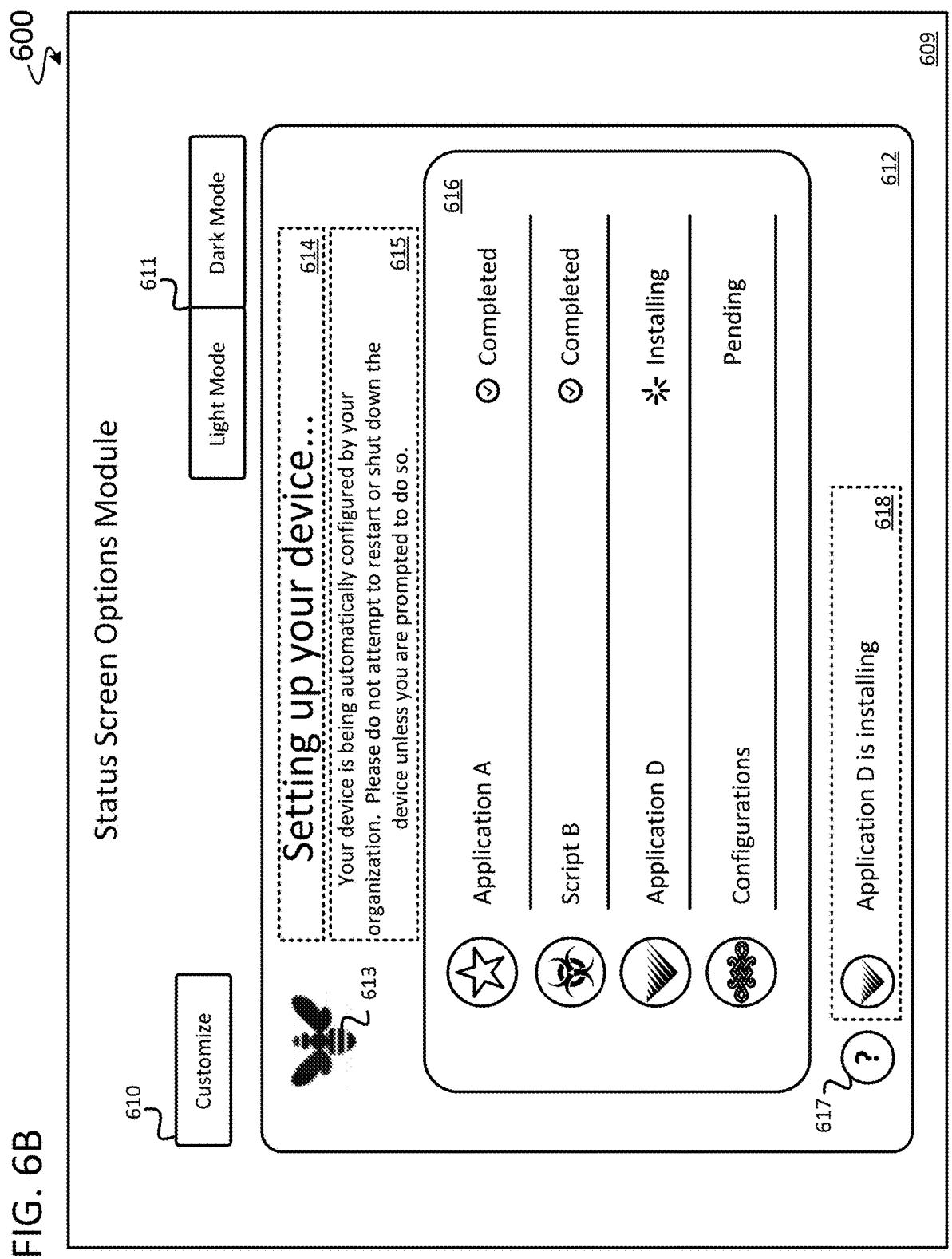

FIG. 6B shows a second portion of the simplified example user interface 600 for customizing aspects of the initialization orchestration module as part of steps 506 and 508 of the process 500, in accordance with some embodiments. A status screen options module 609 includes a customize selection interface 610, a light-dark display mode interface 611, and a configuration screen preview display 612. The configuration screen preview display 612 includes a logo preview 613, a header preview 614, a sub-header preview 615, a configuration item list progress and status display preview 616, a help button interface preview 617, and a configuration item progress and status display preview 618.

As compared to conventional solutions that may rely on configuration scripts or text-based parameters, the configuration screen preview display 612 advantageously provides the administrator with a realistic preview of the configuration screen that a user will see when the initialization orchestration module is operating at that user's computing device and to make changes accordingly. For example, the administrator may select a color palette of the initialization orchestration module using the light-dark display mode interface 611. The administrator may also select the customize selection interface 610 to further customize the configuration screen previewed by the configuration screen preview display 612. In some embodiments, upon selection (e.g., by the administrator) of the customize selection interface 610, a customization interface is provided via the user interface 600.

Figure 6C:
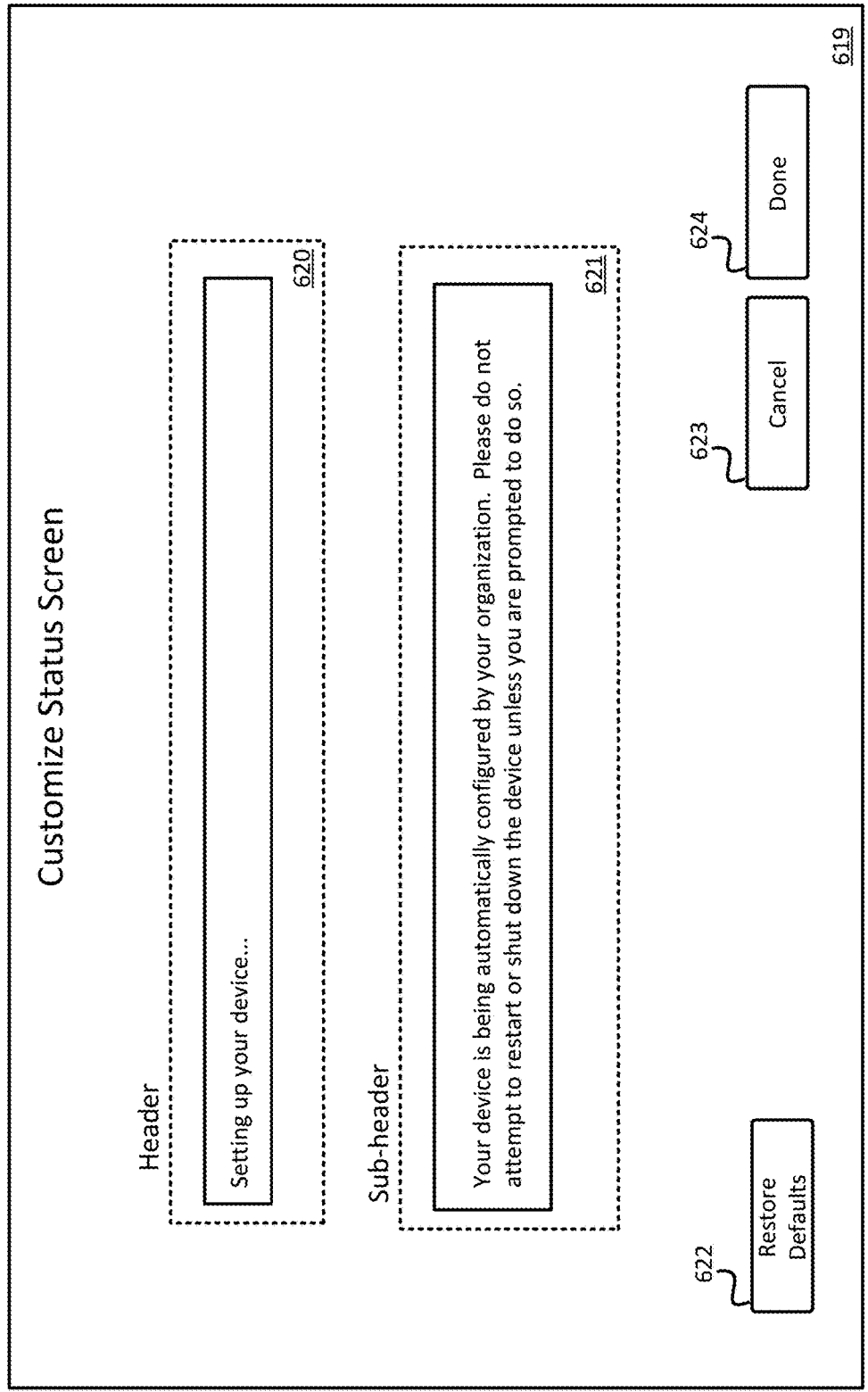

For example, FIG. 6C shows a third portion of the simplified example user interface 600 for customizing an initial configuration screen of the initialization orchestration module as part of step 508 of the process 500, in accordance with some embodiments. A status screen customization interface 619 includes a header customization interface 620, a sub-header customization interface 621, a restore defaults interface 622, a cancel interface 623, and a done interface 624. The header customization interface 620 enables the administrator to customize the header text that was shown in the header preview 614 of FIG. 6B. Similarly, the sub-header customization interface enables the administrator to customize the sub-header text that was shown in the sub-header preview 615. Upon selection, the restore defaults interface 622 restores both the initial configuration header text 614 and the initial configuration sub-header text 615 to their respective predetermined defaults. Upon selection, the cancel interface 623 exits the status screen customization interface 619, and the user interface 600 displays the previously described status screen options module 609 without modifying the initial configuration header text 614 and the initial configuration sub-header text 615. By contrast, upon selection, the done interface 624 exits the status screen customization interface 619 and the user interface displays the previously described status screen options module 609 with any modifications to the initial configuration header text 614 and the initial configuration sub-header text 615 that were made in the interface 619.

Figure 6D:
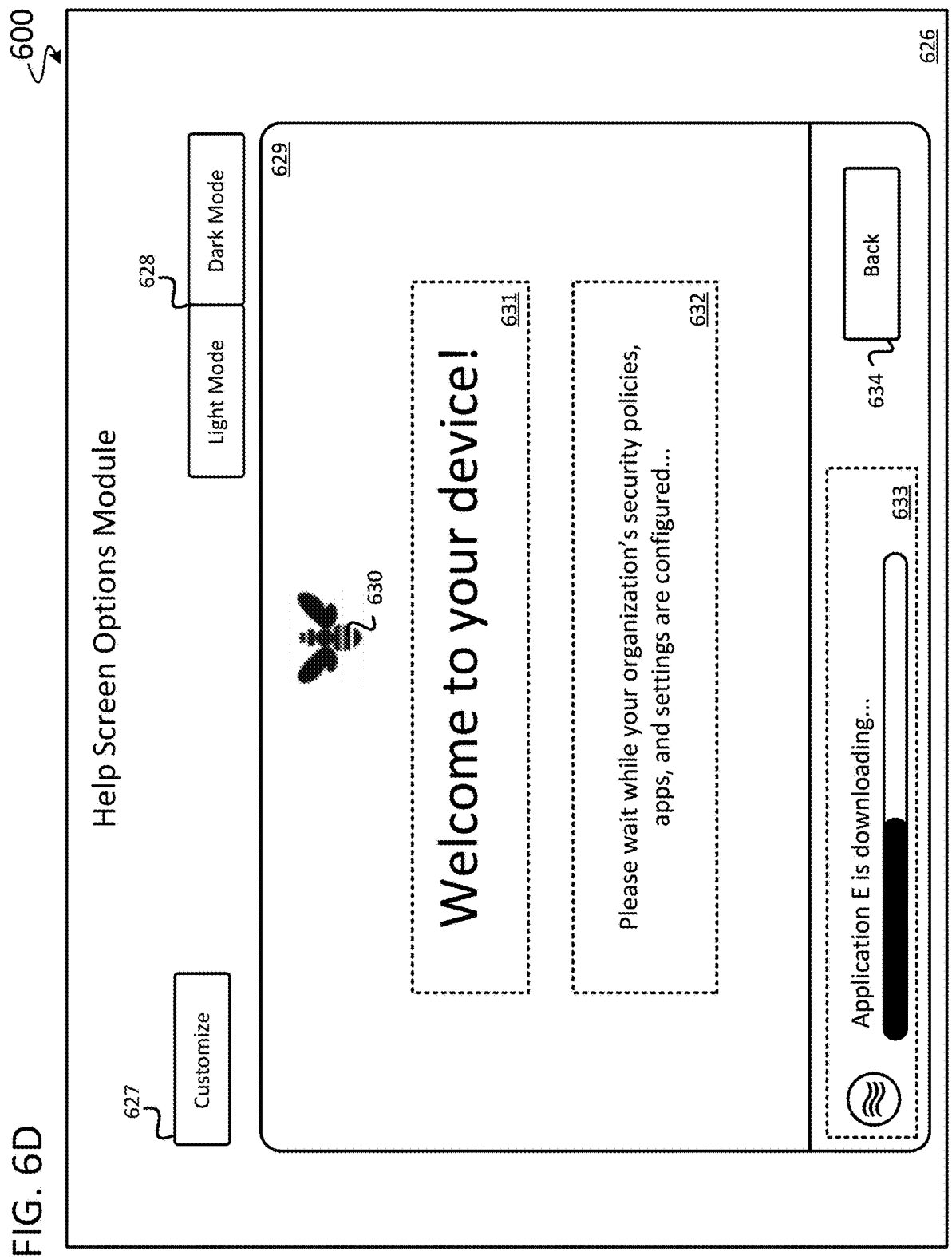

Returning attention to FIG. 6B, upon selection (e.g., by the administrator) of the help button interface preview 617, a customizable help screen preview is provided via the user interface 600. For example, FIG. 6D shows a fourth portion of the simplified example user interface 600 for customizing the initialization orchestration module as part of steps 506 and 508 of the process 500, in accordance with some embodiments. A help screen options module 626 includes a customize selection interface 627, a light-dark display mode interface 628, and a help screen preview display 629. The help screen preview display 629 includes a logo preview 630, a header preview 631, a sub-header preview 632, a configuration item progress and status display preview 633, and a back button interface 634.

As compared to solutions that may rely on configuration scripts or text-based parameters, the help screen preview display 629 advantageously provides the administrator with a realistic preview of the help screen that a user will see when the initialization orchestration module is operating at that user's computing device and to make changes accordingly. For example, the administrator may select a color palette of the help screen using the light-dark display mode interface 628. The administrator may also select the customize selection interface 627 to further customize the help screen. In some embodiments, upon selection of the customize selection interface 627, a help screen customization interface is provided via the user interface 600.

Figure 6E:
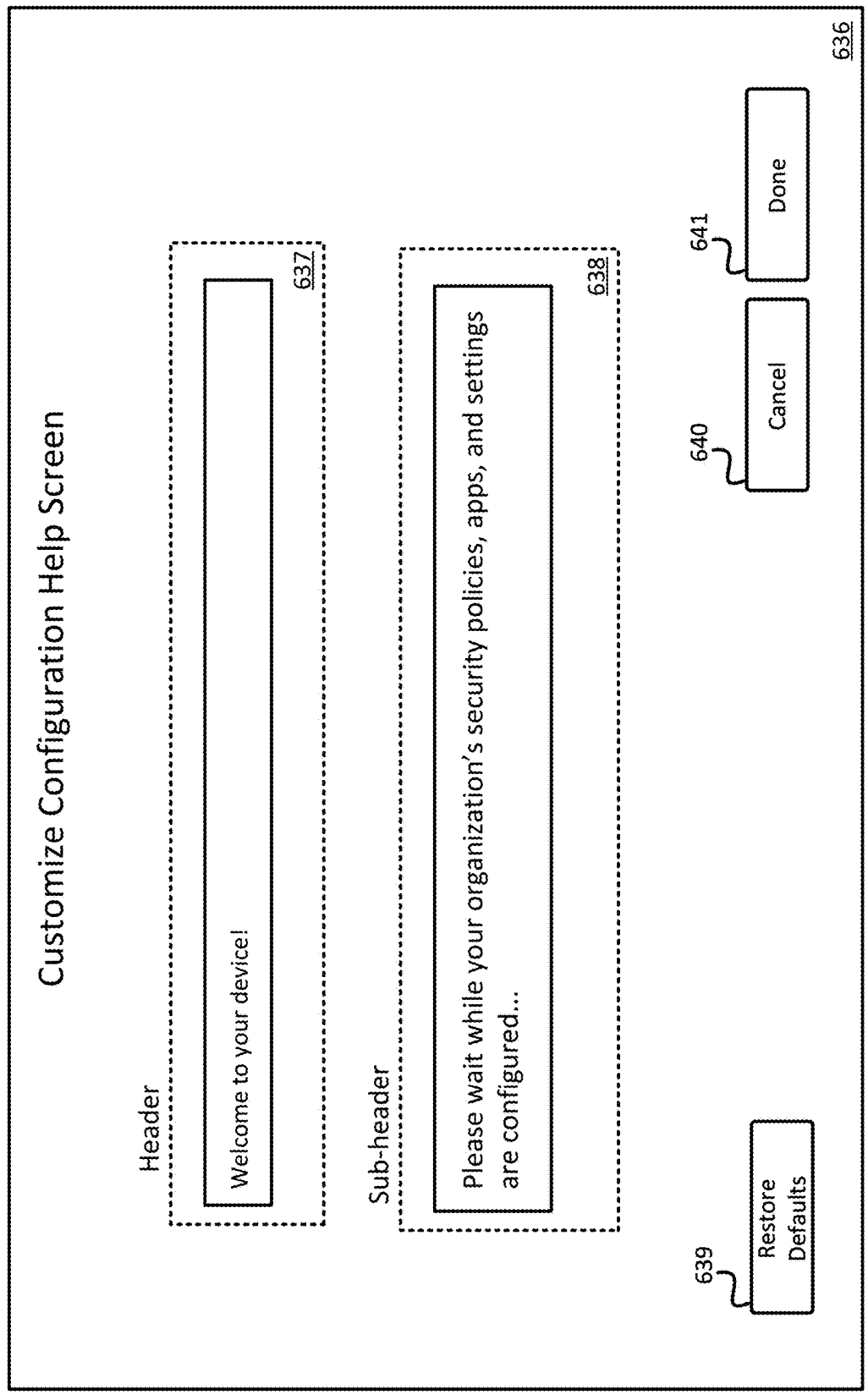

For example, FIG. 6E shows a fifth portion of the simplified example user interface 600 for customizing a help screen of the initialization orchestration module as part of steps 508 of the process 500, in accordance with some embodiments. A help screen customization interface 636 includes a help screen header customization interface 637, a help screen sub-header customization interface 638, a restore defaults interface 639, a cancel interface 640, and a done interface 641. The help screen header customization interface 637 enables the administrator to customize header text that was shown in the header preview 631 shown in FIG. 6D. Similarly, the sub-header customization interface 638 enables the administrator to customize the sub-header text that was shown in the sub-header preview 632. Upon selection, the restore defaults interface 639 restores both the help screen header text 631 and the help screen sub-header text 632 to their respective predetermined defaults. Upon selection, the cancel interface 640 exits the help screen customization interface 636 and the user interface displays the previously described help screen options module 626 without modifying the help screen header text 631 and the help screen sub-header text 632. By contrast, upon selection, the done interface 641 exits the help screen customization interface 636, and the user interface 600 displays the previously described help screen options module 626 with any modifications to the help screen header text 631 and the help screen sub-header text 632 that were made in the interface 636.

Figure 6F:
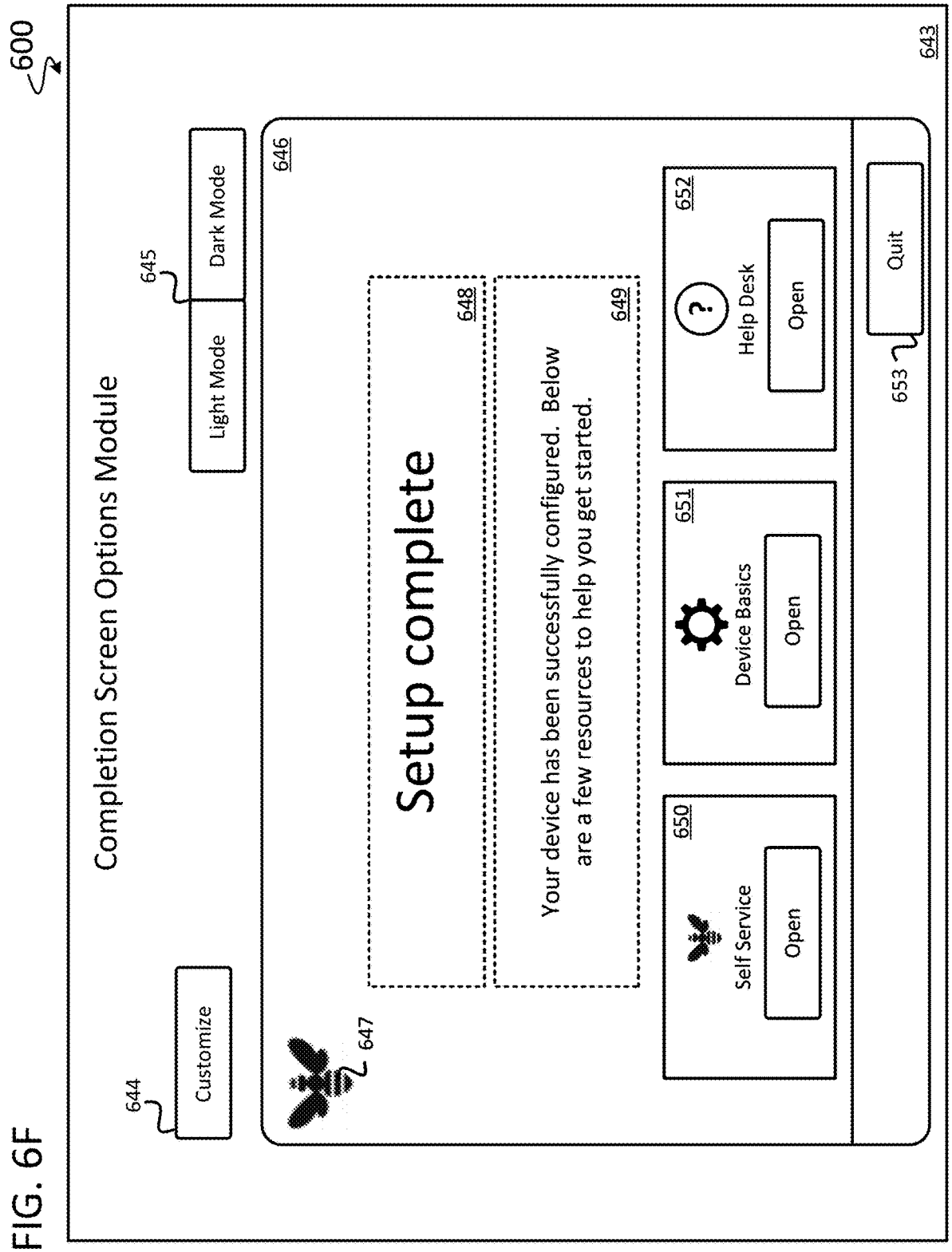

After the initialization orchestration module has completed installation, configuration and/or scripted operations at the computing device, a customizable completion screen is displayed to the user. For example, FIG. 6F shows a sixth portion of the simplified example user interface 600 for customizing a completion screen of the initialization orchestration module as part of steps 508 of the process 500, in accordance with some embodiments. An example completion screen options module 643 includes a customize selection interface 644, a light-dark display mode interface 645, and a completion screen preview display 646. The completion screen preview display 646 includes a logo preview 647, a completion header preview 648, a completion sub-header preview 649, completion tile previews 650-652, and a quit interface 653.

The completion tile previews 650-652 represent completion tiles that are advantageously presented to a user at the computing device as a completion step of the initialization orchestration module. Each completion tile includes a customizable graphical interface that upon selection calls a link (e.g., to a URL via a web browser), opens an operating system interface, or calls an application at the computing device. For example, a completion tile previewed by the interface 650 could direct a user to a web-portal or operating system configuration screen that would allow the user to make permissible modifications or configuration changes to the computing device. A completion tile previewed by the interface 651 could direct a user to a web page or operating system interface that provides the user with a tutorial. A completion tile previewed by the interface 652 could direct the user to a web-portal or automated help engine to address any technical questions or concerns that the user might have.

As compared to conventional solutions that may rely on configuration scripts or text-based parameters, the completion screen preview display 646 advantageously provides the administrator with a realistic preview of the completion screen that a user will see when the initialization orchestration module is operating at that user's computing device and to make changes accordingly. For example, the administrator may select a color palette of the completion screen using the light-dark display mode interface 645. The administrator may also select the customize selection interface 644 to further customize the completion screen. In some embodiments, upon selection of the customize selection interface 644, a completion screen customization interface is provided via the user interface 600.

Figure 6G:
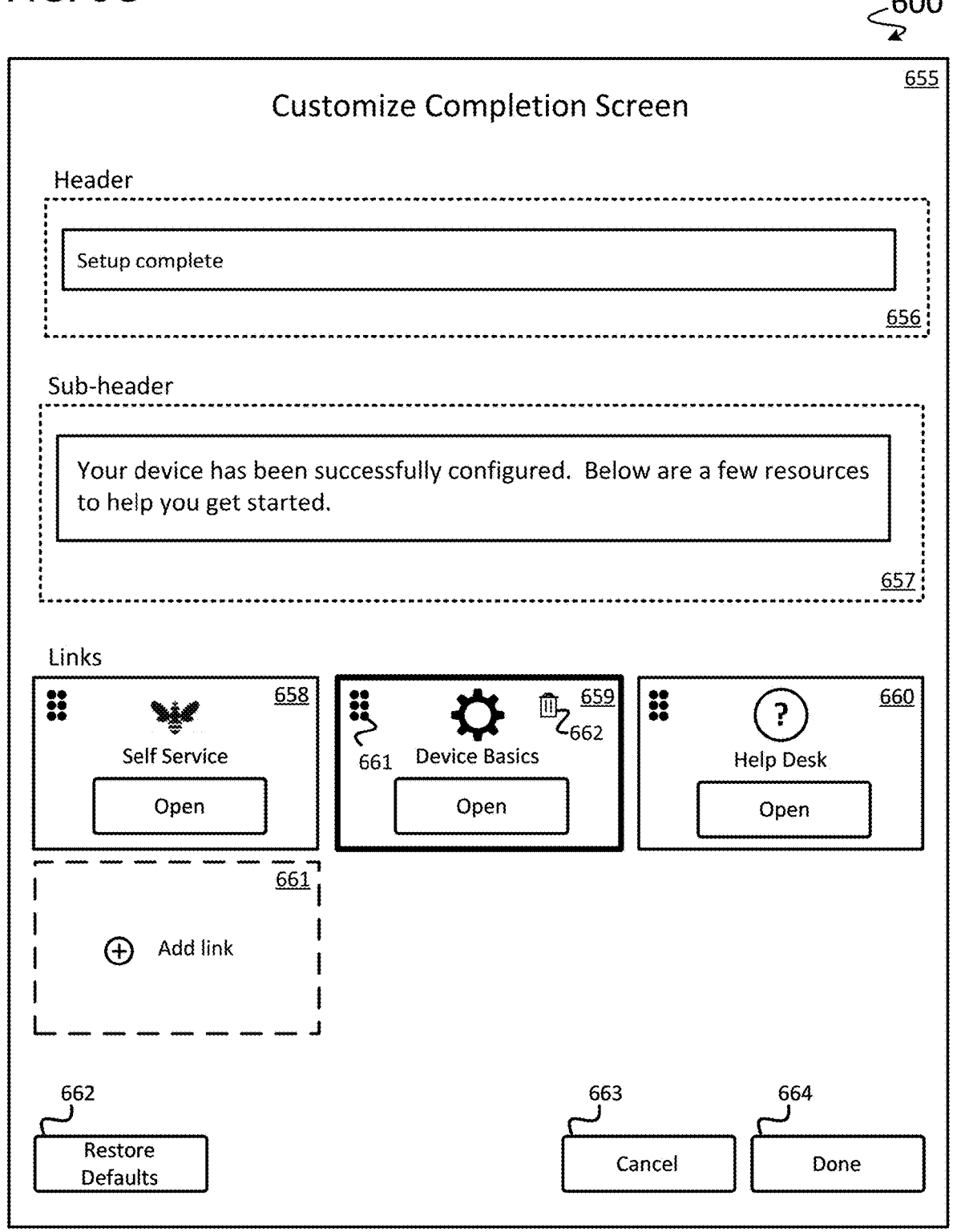

For example, FIG. 6G shows a seventh portion of the simplified example user interface 600 for customizing a completion screen of the initialization orchestration module as part of steps 508 of the process 500, in accordance with some embodiments. A completion screen customization interface 655 includes a completion screen header customization interface 656, a completion screen sub-header customization interface 657, completion tile customization interfaces 658-661, a restore defaults interface 662, a cancel interface 663, and a done interface 664.

The completion screen header customization interface 656 enables an administrator to customize header text that was shown in the header preview 648. Similarly, the sub-header customization interface 657 enables the administrator to customize the sub-header text that was shown in the sub-header preview 649. Upon selection, the restore defaults interface 662 restores the completion screen header text 648, the completion screen sub-header text 649, and the completion tiles 650-652 to their respective predetermined defaults. Upon selection, the cancel interface 663 exits the completion screen customization interface 655 and the user interface displays the previously described completion screen options module 643 without modifying the completion screen header text 648, the completion screen sub-header text 649, or the completion tile previews 650-652. By contrast, upon selection, the done interface 664 exits the completion screen customization interface 655 and the user interface 600 displays the previously described completion screen options module 643 with any modifications to the completion screen header text 648, the completion screen sub-header text 649, or the completion tiles 650-652 that were made in the interface 655.

The completion tile customization interfaces 658-661 enable an administrator to edit previously configured or default completion tiles (e.g., via interfaces 658-660) and/or to create a new completion tile (e.g., via the interface 661). For example, the completion tile customization interface 659 includes an edit interface 661 and a deletion interface 662. Upon selection, the deletion interface 662 removes an associated completion tile from the completion screen that will be presented to the user upon completion of the initialization orchestration module. In some embodiments, upon selection of the edit interface 661, a completion tile customization interface is provided via the user interface 600.

For example, FIG. 6H shows an eighth portion of the simplified example user interface 600 for customizing a completion tile of the initialization orchestration module as part of steps 508 of the process 500, in accordance with some embodiments. A completion tile customization interface 669 includes a completion tile icon customization interface 670, a completion tile title customization interface 671, a completion tile sub-title customization interface 672, a completion tile button text customization interface 673, a completion tile button URL customization interface 674, a restore defaults interface 675, a cancel interface 676, and a done interface 678.

The completion tile icon customization interface 670 enables an administrator to select or upload an icon or logo that will be displayed as part of the completion tile being customized. Similarly, the completion tile title customization interface 671, and the completion tile sub-title customization interface 672 enable the administrator to add, delete, or edit that completion tile's respective title and sub-title text. The completion tile button text customization interface 673 enables an administrator to select what text will be displayed on a button interface of the completion tile. The completion tile button URL customization interface 674 enables the administrator to specify what URL, operating system interface, or application will be displayed or launched upon selection of the completion tile by a user at the computing device (e.g., using the button associated with the button text). Upon selection, the restore defaults interface 675 restores the associated completion tile to a default state. Upon selection, the cancel interface 676 exits the completion tile customization interface 669, and the user interface 600 displays the previously described completion screen customization interface 655 without modifying the completion tile that was being customized. By contrast, upon selection, the done interface 678 exits the completion tile customization interface 669, and the user interface 600 displays the previously described completion screen customization interface 655 with any modifications to the completion tile that were made in the interface 669.

As an administrator configures and customizes the initialization orchestration module using the user interface 600, configuration data is generated for that initialization orchestration module and is stored at the management platform for later retrieval by a device agent at a computing device as part of step 510 of the process 500.

Figure 7:
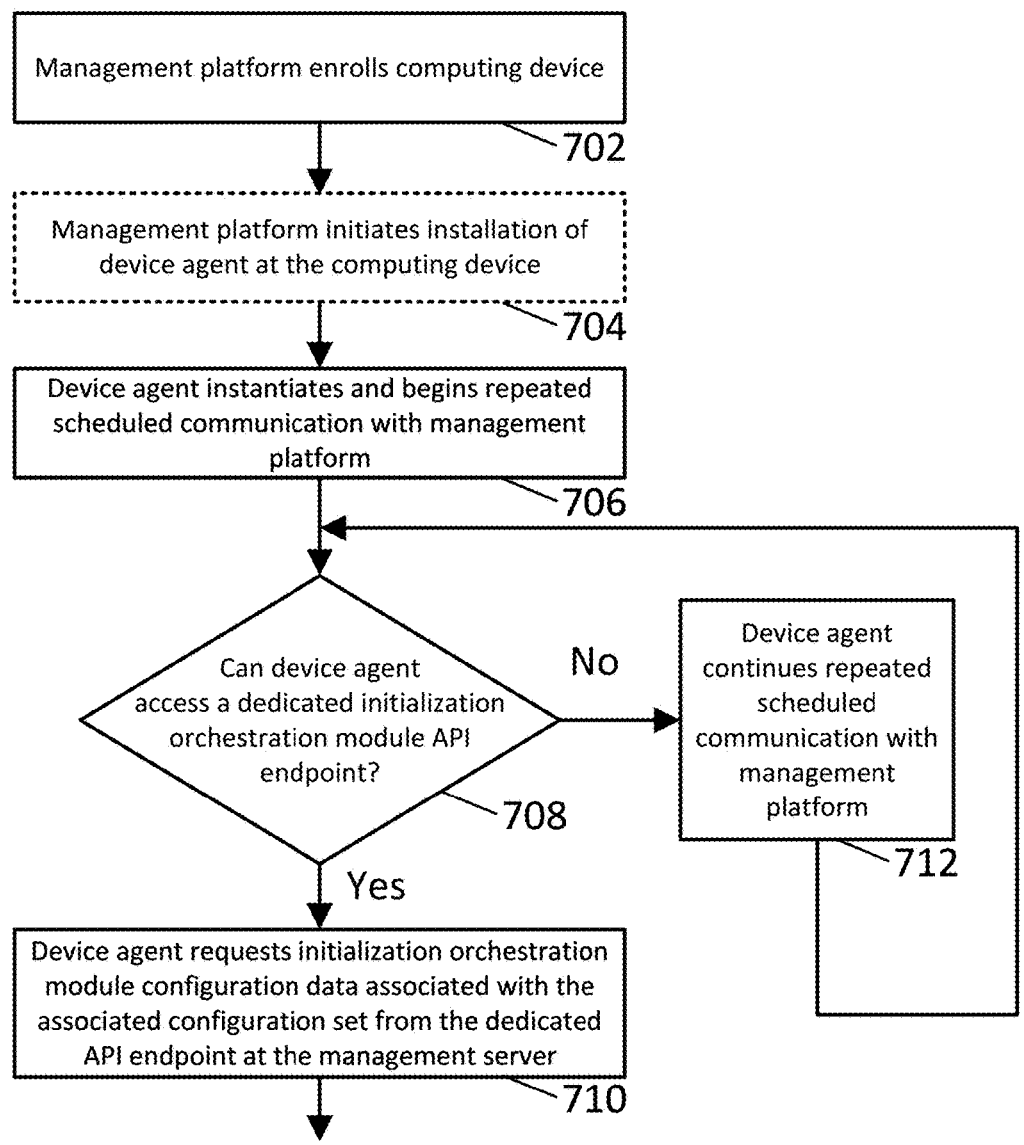
FIGS. 7-10 show portions processes for an initial configuration of a computing device of the network platform shown in FIG. 1, in accordance with some embodiments.

FIG. 7 provides a simplified portion of a process 700 that implements a portion of step 510 of the process 500, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 702, a computing device is enrolled with the management platform, as described above with reference to steps 217 and 221 shown in FIG. 2. Enrollment is a process used to register a computing device with a management platform, after which configurations stored at the management platform can be distributed to the computing device. At step 704, in some embodiments the management platform conditionally causes a device agent to be installed at the computing device, as described above with reference to steps 223, 225, and 227 shown in FIG. 2. In other embodiments, the device agent was previously installed at the computing device. At step 706, the device agent is instantiated at the computing device and begins repeated scheduled communication with the management platform, as described above with reference to FIG. 3.

As part of the repeated scheduled communication with the management platform, at step 708 the device agent attempts to access a dedicated initialization orchestration module application programming interface (API) endpoint at the management platform. An API endpoint allows two systems to communicate with one another, and provides a protocol for how the two systems will communicate with each other. In some embodiments, the device agent determines that it can access the dedicated initialization orchestration module application programming interface (API) endpoint by determining if the dedicated initialization orchestration module API endpoint is responsive to commands, communication and/or queries.

In some embodiments, the dedicated initialization orchestration module API endpoint is advantageously implemented as a dedicated bi-directional communication channel that is operable to send event-driven signals between the management platform and the device agent. If the initialization orchestration module was disabled using the operating interface 602, the management platform will not create an initialization orchestration interface API. Conversely, if the initialization orchestration module was enabled using the operating interface 602, the management platform will create an initialization orchestration interface API. If it is determined at step 708 that the device agent can access the dedicated initialization orchestration module API endpoint, flow of the process continues to step 710. At step 710, the device agent requests, from the management platform using the dedicated API endpoint, initialization orchestrion module configuration data associated with the associated configuration set that was specified at steps 504 through 508 of the process 500 (e.g., from the data source 111 of the management platform 110). After step 710, flow continues to step 802 of a process 800 shown in FIG. 8. However, if it was determined at step 708 that the device agent could not access the dedicated initialization orchestration module API endpoint, flow of the process continues to step 712. At step 712, the device agent continues repeated scheduled communication with the management platform, as described with reference to FIG. 3, and returns to step 708.

Figure 8:
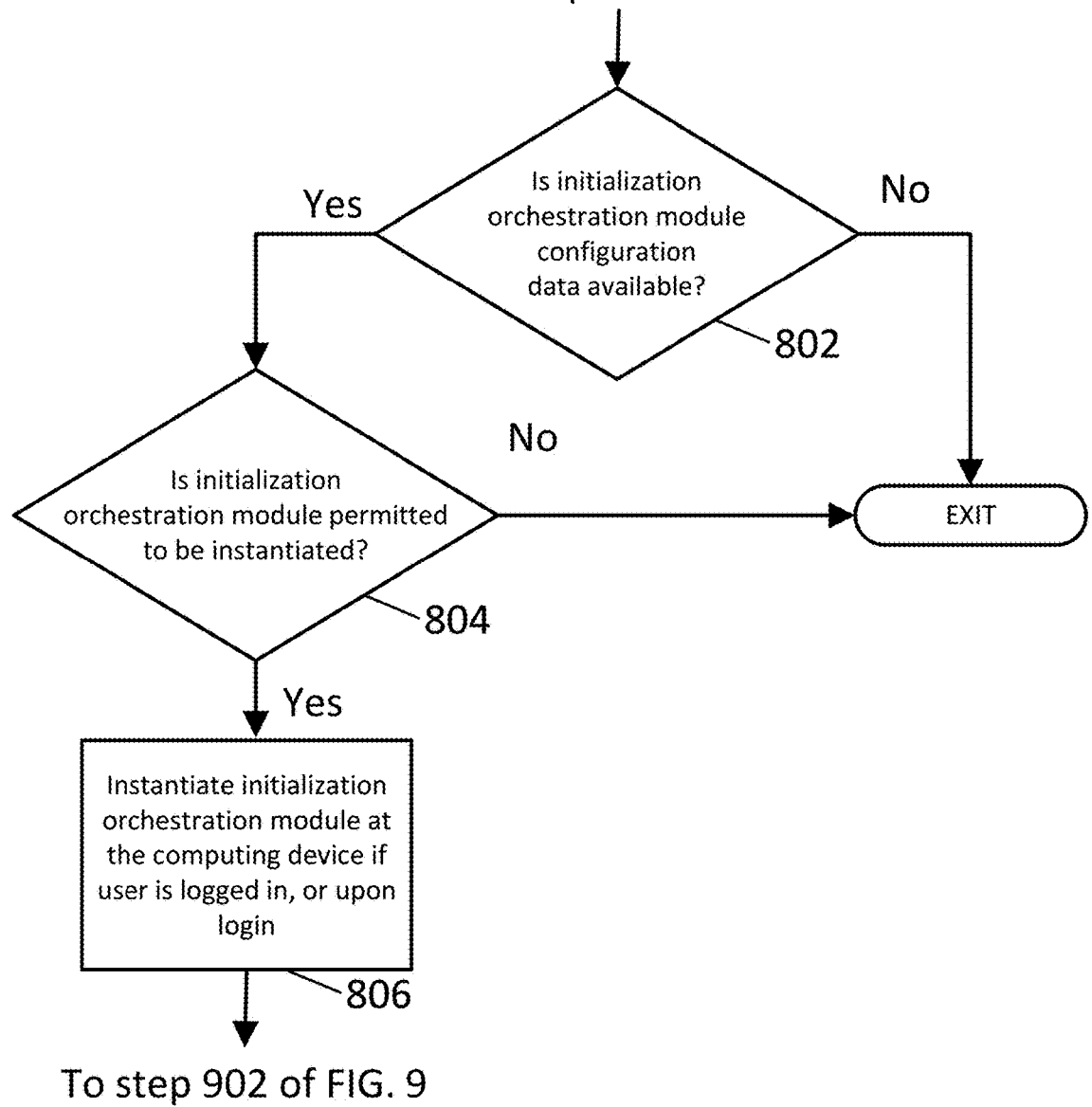

FIG. 8 provides a simplified portion of a process 800 that implements all or a portion of step 512 of the process 500, in accordance with some embodiments. The particular steps, order of steps, and combination of steps are shown for illustrative and explanatory purposes only. Other embodiments can implement different particular steps, orders of steps, and combinations of steps to achieve similar functions or results.

Continuing from step 710 of the process 700, at step 802, it is determined, by the device agent at the computing device using the dedicated API endpoint described above, if configuration data is available at the management platform for the initialization orchestration module. If it is determined at step 802 that the configuration data is available, flow of the process 800 continues to step 804. At step 804, the device agent at the computing device determines if the initialization orchestration module is permitted to be instantiated at the computing device. In some embodiments, the determination at step 804 is based on one or more of the initialization orchestration configuration data, a device enrollment datetime of the computing device, a current state of the computing device (e.g., network connectivity), and/or other factors (e.g., operating system version). If the device agent determined at step 804 that the initialization orchestration module is permitted to be instantiated, flow of the process continues to step 806. At step 806, the initialization orchestration module is instantiated by the device agent at the computing device if the user is already logged into the computing device, or upon login by the user to the computing device. Flow then continues to step 902 of a process 900 shown in FIG. 9. However, if it was determined at step 802 that configuration data is not available at the management platform for the initialization orchestration module, or if it was determined at step 804 that the initialization orchestration module is not permitted to run at the computing device, the process 800 completes (e.g., user log-on continues at the computing device).

Figure 9:
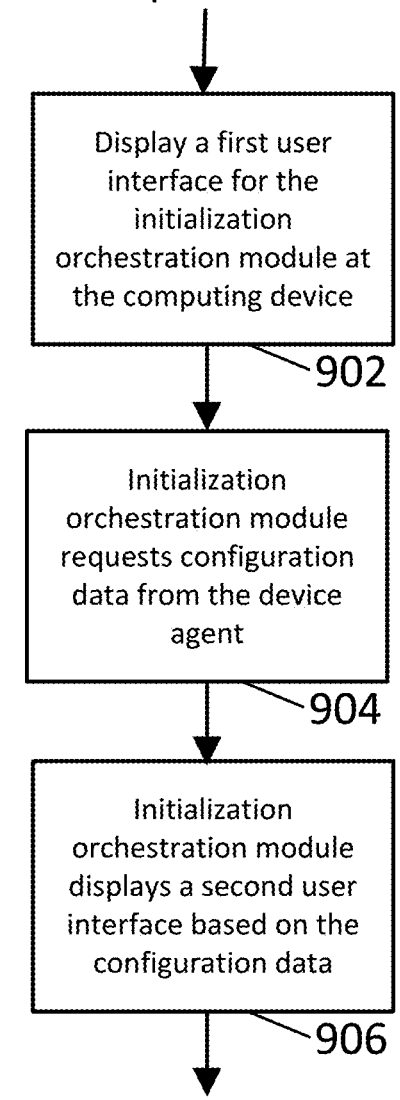

FIG. 9 provides a simplified portion of a process 900 that continues all or a portion of step 512 of the process 500, in accordance with some embodiments. The particular steps, order of steps, and combination of steps are shown for illustrative and explanatory purposes only. Other embodiments can implement different particular steps, orders of steps, and combinations of steps to achieve similar functions or results.

Figure 11:
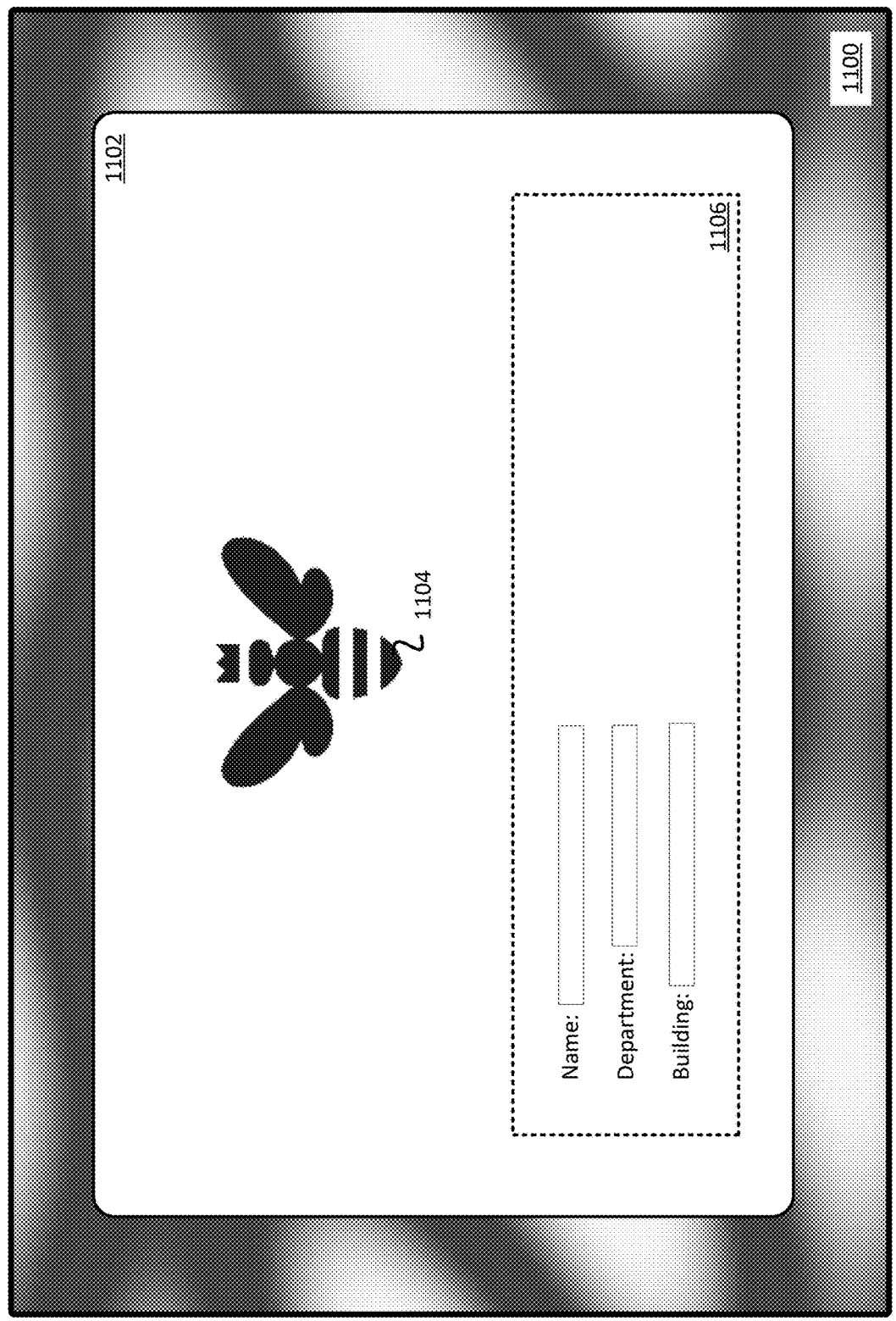
FIGS. 11-14 show simplified portions of user interfaces of an initialization orchestration module, in accordance with some embodiments.

At step 902, a first user interface for the initialization orchestration module is displayed at the computing device. In some embodiments, the first user interface is a static or animated splash screen that informs the user that the initialization orchestration module has begun operation. A simplified example of a first user interface 1102 is shown in FIG. 11, in accordance with some embodiments. In the example shown, the first user interface 1102 is a focus-locked display that includes a still or animated graphical image 1104 that is displayed on a screen 1100 of the computing device. In some embodiments, the first user interface 1102 optionally includes a user data interface 1106 that allows a user to enter personal information such as their name, department, building, etc. Such personal information is sent by the initialization orchestration module to the management platform which then uses the received personal information to determine a group membership of the user. The group membership then advantageously may be used by the management platform to determine an appropriate configuration set to be processed at the computing device.

Figure 12:
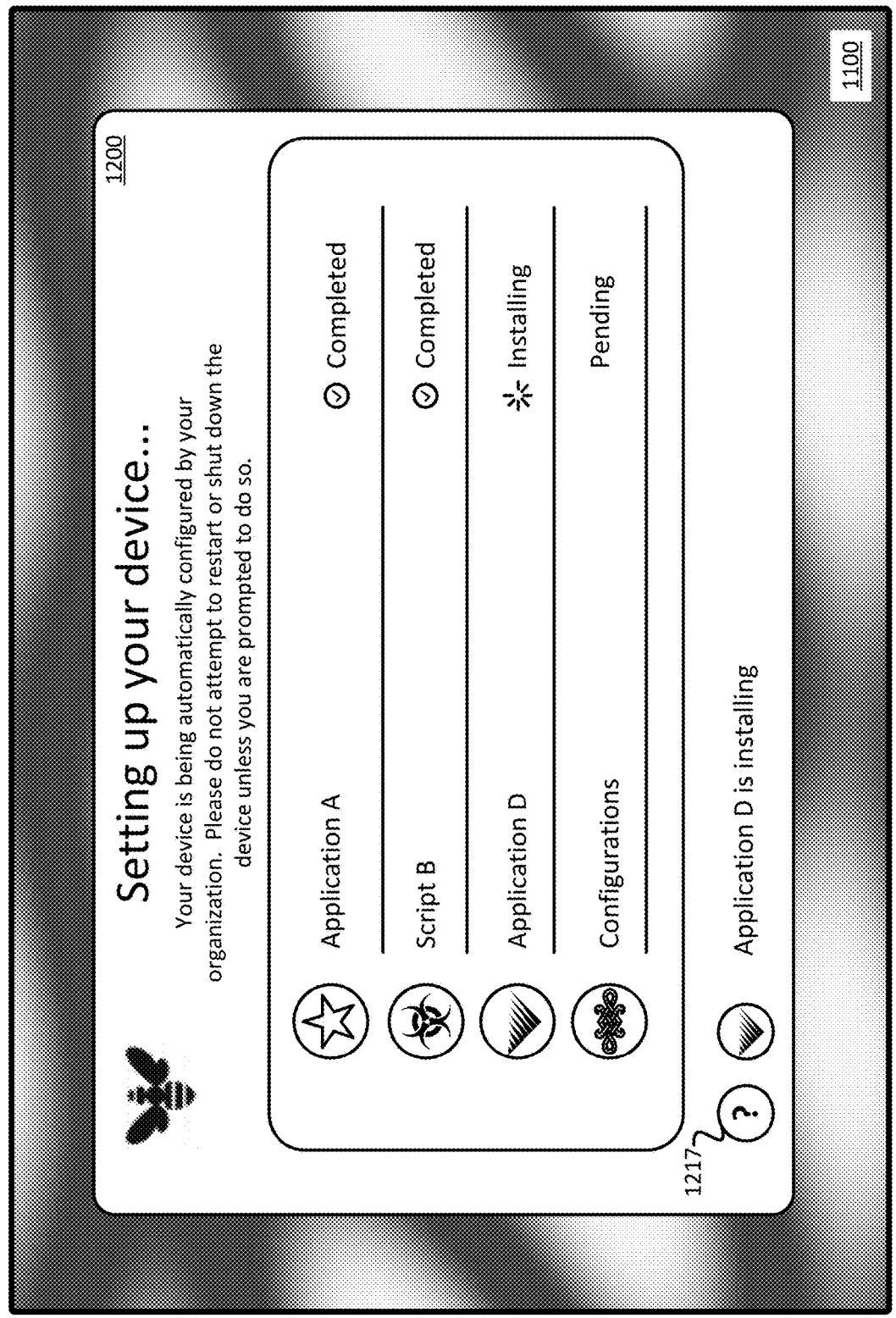

Returning attention to FIG. 9, at step 904, the initialization orchestration module requests initialization orchestration module configuration data from the device agent at the computing device that was requested by the device agent at step 710 of the process 700. At step 906, the initialization orchestration displays a second user interface at the computing device that is in accordance with the configuration data (e.g., a customized interface in accordance with the customization decisions made by an administrator as part of step 508 of the process 500). A simplified example of the second user interface is shown in FIG. 12, in accordance with some embodiments, and is described in detail below. After step 906, flow continues to step 1002 of a process 1000 shown in FIG. 10.

Figure 10:
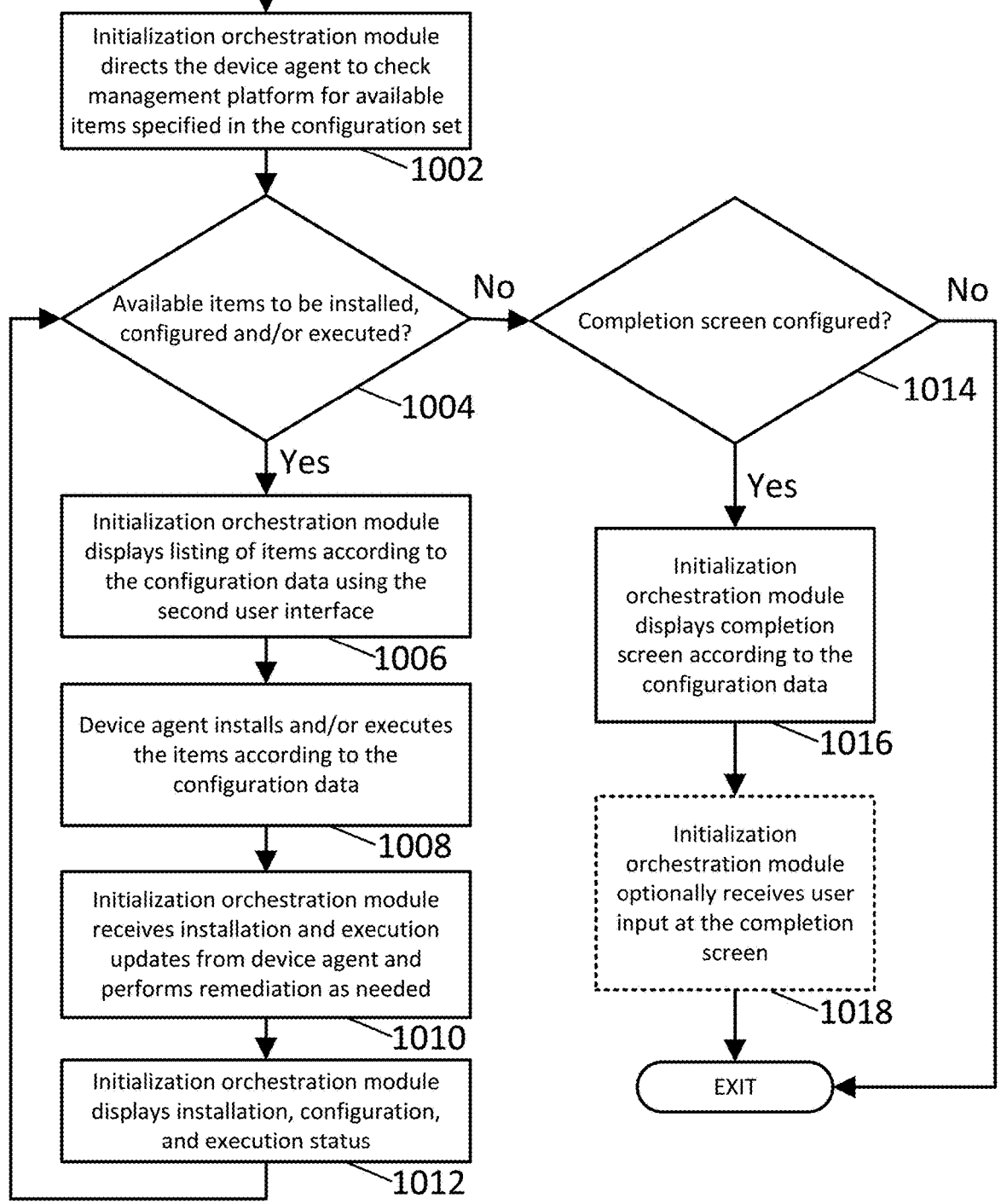

FIG. 10 provides a simplified portion of a process 1000 that performs all or a portion of step 514 of the process 500, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 1002, the initialization orchestration module directs the device agent to check the management platform for available items specified in the configuration set via a bi-directional inter-process communication (IPC) protocol. In some embodiments, the configuration set is, or includes, the configurations that were determined and stored at the management platform 110 as shown and described with reference to FIG. 2.

The directive, by the initialization orchestration module, for the device agent to check the management platform may be a forced check that occurs asynchronously to the repeated scheduled check that was described with reference to FIG. 3. As such, responsiveness of a user experience is improved as compared to a solution that cannot direct an initialization application to asynchronously check in with a management platform without some form of user intervention (e.g., using a "check for updates" button). Such directives sent by the initialization orchestration module are made possible by the bi-directional inter-process communication between the initialization orchestration module and the device agent.

In some embodiments, the initialization orchestration module advantageously sends high-level commands to the device agent, which in turn handles communication with the management platform in accordance with API requirements thereof. As such, updates to communication protocols, API details, and security protocols required to communicate with the management platform may be solely handled by the device agent and thus are abstracted from the initialization orchestration module.

At step 1004, it is determined by the initialization orchestration module if there are available configuration items to be installed, applied, and/or executed at the computing device. Such configuration items include configuration items described below in a "Configurations" section, as well as software applications to be installed, settings to be applied, updates to the device agent itself, scripts and/or applications to be executed, etc.

If it was determined at 1004 that there are available items to be installed, configured, applied, and/or executed at the computing device, flow of the process 1000 continues to step 1006. At step 1006, the initialization orchestration module displays the determined configuration items using the second user interface in accordance with the initialization orchestration module configuration data (e.g., as specified at step 508 of the process 500 and/or using the user interface 600). In some embodiments, the device agent sends the initialization orchestration module an entire listing of items to be processed at the computing device. In other embodiments, the device agent sends the initialization orchestration module a partial listing of items to be processed at the computing device. For example, in such embodiments, the device agent may send a listing of each item to the initialization orchestration module as the device agent begins to process it. Or, in some embodiments, the device agent may send a listing of each item to the initialization orchestration module as the device agent begins to process it, as well as a next item to be processed. As each item is processed by the device agent, the device agent sends status messages related to the processing of that item to the initialization orchestration module. The initialization orchestration module may display the entirety of the status message using a focus-locked graphical status screen user interface, may display a subset of the status message, or may display an interpretation of the status message. For example, the status message may include a name of the item, a percentage of process completion, system logging information, high-level error messages, low-level error messages, and/or other information. The focus-locked graphical status screen user interface may in turn display just the item name and a graphical representation of a percentage of process completion, as well as a graphical indication that the process is still underway. If the status message includes an indication of an error as well as system logging information, the focus-locked graphical status screen user interface may in turn advantageously just display that an error has occurred and not display the system logging information. Such selective display of information by the initialization orchestration module advantageously provides a simplified user experience to an end-user as compared to conventional solutions that simply convert system or application logging information into a graphical display without tailoring the presentation.

A simplified example of the second user interface is shown in FIG. 12, in accordance with some embodiments. In the example shown, a status screen 1200 of the second user interface is a focus-locked display shown on the screen 1100 of the computing device. The user interface 1200 includes a help button interface 1217 in addition to other graphical elements as shown. As shown, the user interface 1200 is displayed in accordance with the customized configuration data generated using the user interface 600 as was shown and described with respect to FIG. 6B.

At step 1008, the device agent processes each of the identified items by respectively installing, applying, and/or executing each of the determined items at the computing device and additionally configuring the operating system of the computing device based on the determined items as directed. In some embodiments, the initialization orchestration module and/or the device agent are advantageously operable to determine a priority and processing order for each of the determined items. In some embodiments, the priority and processing order may be in accordance with configuration data received by the initialization orchestration module or the device agent from the management platform. In some embodiments, the priority and processing order may be additionally, or alternatively, based on a determined system state of the computing device that is determined by the initialization orchestration module or the device agent. In some embodiments, a system state of the computing device is additionally, or alternatively, determined based on information provided to the initialization orchestration module by the device agent at the computing device.

At step 1010, the initialization orchestration module receives installation, execution, and configuration status updates from the device agent at the computing device and optionally performs remediation as needed. As the device agent processes each of the determined items, the device agent sends status updates to the initialization orchestration module, using bi-directional inter-process communication protocols, which in turn updates the user interface 1200 so that the user understands what operations are being performed on the computing device.

Additionally, if the device agent determines that an error has occurred while processing one of the identified items, the initialization orchestration module is advantageously operable to direct the device agent, via inter-process communication, to take steps to remedy the error. Such steps may include providing a focus-locked user interface to a user to select a network connection if there is no existing network connection at the computing device or if there has been an interruption in network connectivity, pausing and resuming the initial configuration process if there has been a network interruption at the computing device, directing the device agent to pause downloading data if network connectivity at the computing device is lost, directing the device agent to resume downloading data if network connectivity at the computing device is resumed, sending a status report to an administrator, receiving an indication from the device agent that downloading data has been paused by the device agent, receiving an indication from the device agent that downloading data has been resumed by the device agent, or other actions.

Still additionally, the initialization orchestration module is advantageously operable to batch operating system restart requests generated by the device agent and the operating system during application installation and configuration steps to limit the number of times that the computing device needs to restart. The initialization orchestration module is advantageously operable to display an operating system reboot timer that corresponds to the batched restart requests. Upon device restart, the initialization orchestration module is instantiated again by the device agent unless the initial configuration has been completed.

Such remediation and control actions, enabled based on the bi-directional communication between the initialization orchestration module and the device agent, advantageously provide an improved, orchestrated, initialization experience to a user as compared to conventional solutions which may only report initialization and update status based on log files or other single direction communication protocols (e.g., like a simple graphical overlay that merely reports installation status at the computing device based on parsing log files).

Figure 13:
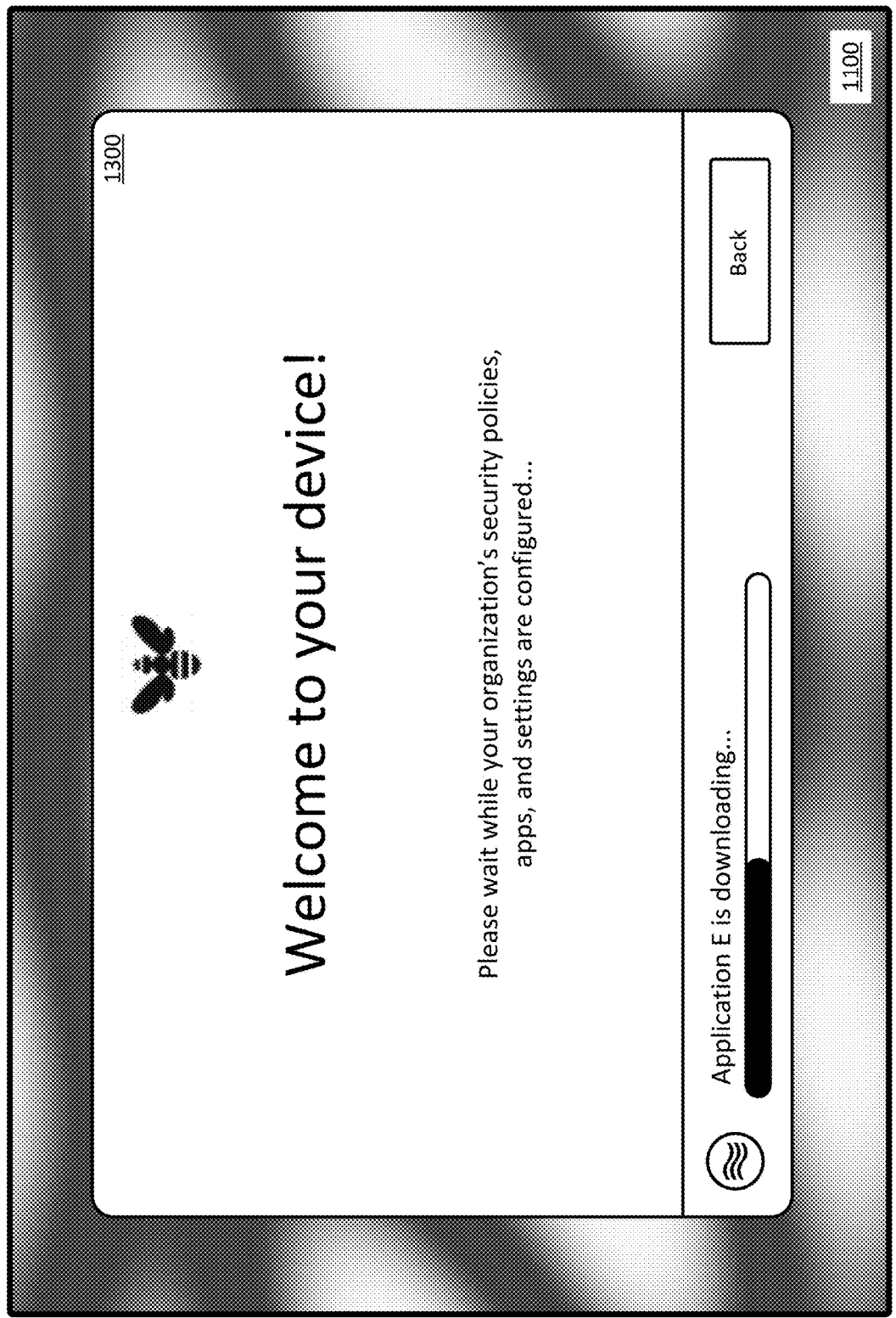

At step 1012, the initialization orchestration module continues to display installation, configuration, and execution status updates at the second user interface at the computing device (e.g., the user interface 1200 shown in FIG. 12). As described above, the second user interface at the computing device remains focus-locked during operation of the initialization orchestration module, unless a user enters an appropriate password to exit the focus-locked operation. However, as described above, a user may select the help button interface 1217 to display a customized help screen. For example, a simplified example of the second user interface when displaying a customized help screen is shown in FIG. 13, in accordance with some embodiments. In the example shown, a help screen 1300 of the second user interface is a focus-locked display shown on the screen 1100 of the computing device. As shown, the help screen 1300 is displayed in accordance with the customized configuration data generated using the user interface 600 as was shown and described with respect to FIG. 6D.

After step 1012, flow of the process 1000 returns to step 1004, where the initialization orchestration module determines if there are additional items to be installed, configured and/or executed. However, if it is determined at step 1004, after either of step 1002 or step 1012, that there are no items to be installed, configured, and/or executed, flow of the process continues to step 1014.

Figure 14:
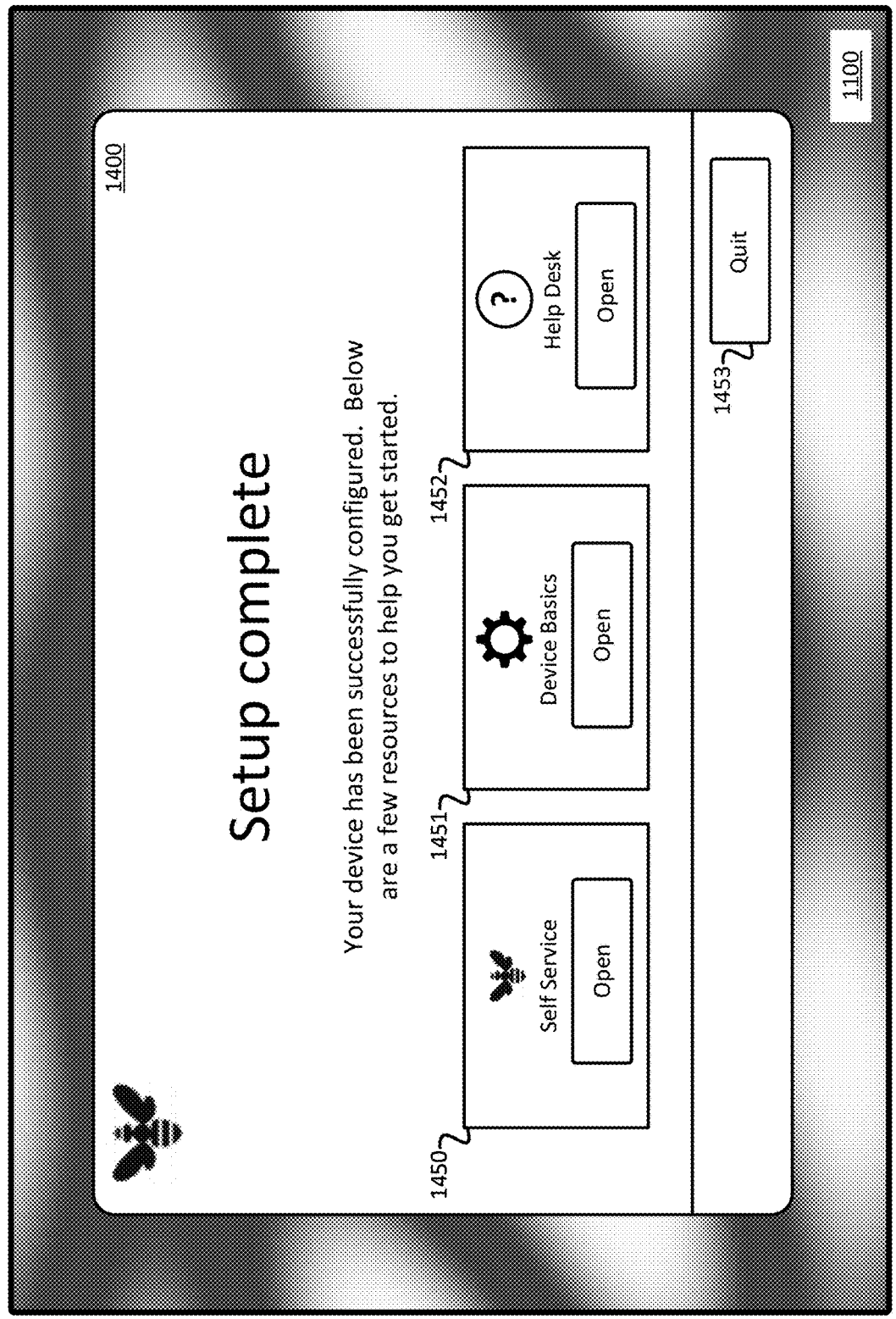

At step 1014, the initialization orchestration module determines, based on the initialization orchestration module configuration data, if a completion screen has been configured. Details of configuring and customizing a completion screen were shown and described with reference to FIG. 6F through FIG. 6H. If it is determined at step 1014 that a completion screen has been configured, flow continues to step 1016. At step 1016, the initialization orchestration module displays a completion screen at the second user interface in accordance with the configuration data received by the initialization orchestration module. For example, a simplified example of the second user interface when displaying a completion screen is shown in FIG. 14, in accordance with some embodiments. In the example shown, a completion screen 1400 of the second user interface is a focus-locked display shown on the screen 1100 of the computing device that includes a quit button interface 1453 and completion tiles 1450-1452, in addition to other graphical elements as shown. The completion screen 1400 is displayed in accordance with the customized configuration data generated using the user interface 600 as was shown and described with respect to FIG. 6F through FIG. 6H.

At step 1018, the initialization orchestration module optionally receives user input at the completion screen. As described above, the customizable completion tiles 1450-1452 are advantageously provided to the user to receive user input upon completion of the initialization orchestration module to provide a convenient way for the user to address any questions, concerns, or needs without having to reach out to an administrator or IT technician, thereby advantageously unburdening the administrator or IT technician from handling issues unnecessarily. In some embodiments, as part of step 514 of the process 500, upon selection of the quit button interface 1453, the initialization orchestration module ceases bi-directional inter-process communication with the device agent and/or exits. Additionally, if it was determined at step 1014 that a completion screen was not configured for the initialization orchestration module, the initialization orchestration module may stop operation in the same manner as described above with reference to the selection of the quit button interface 1453.

Figure 15:
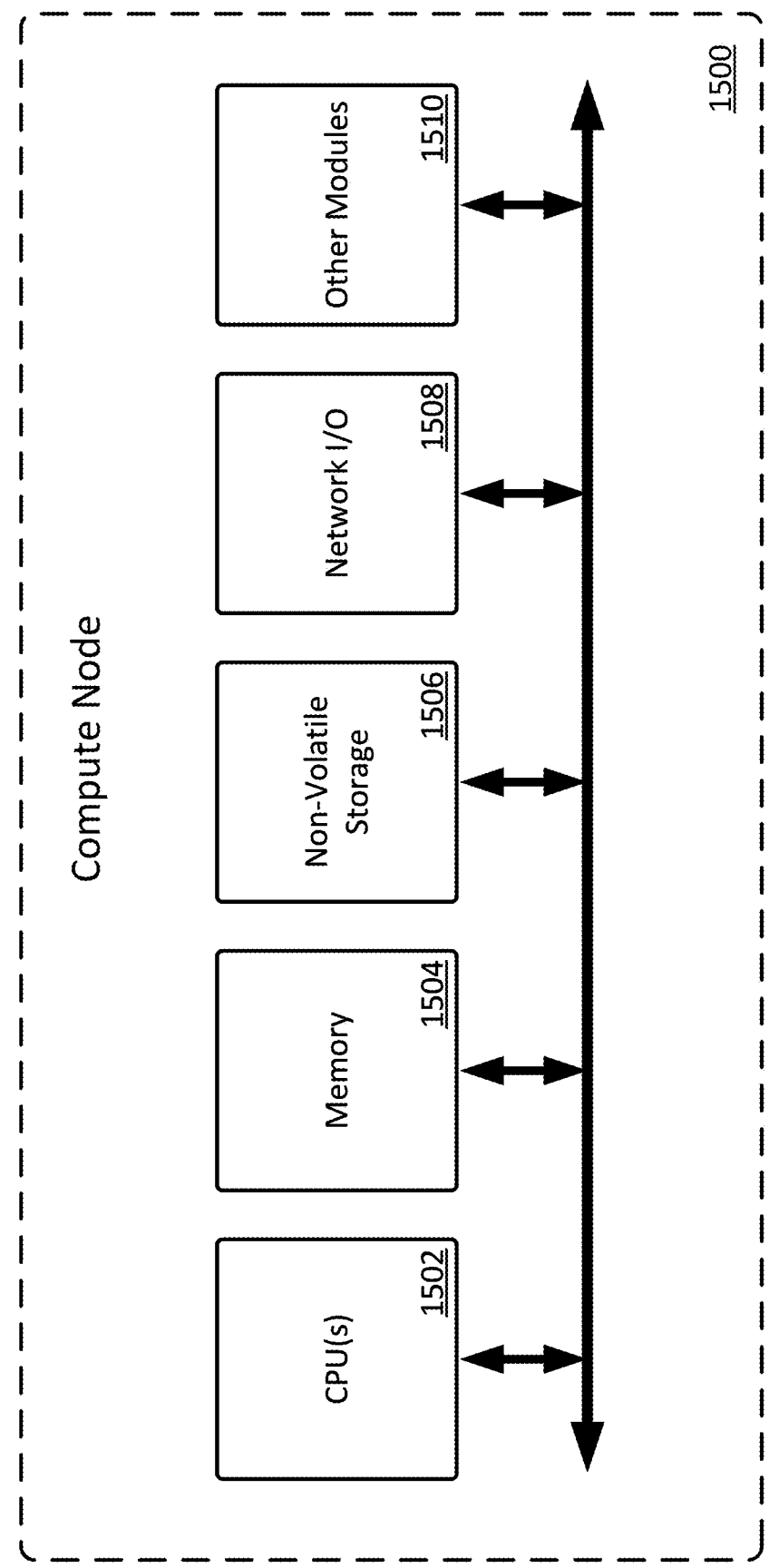
FIG. 15 shows a simplified example compute node that may implement elements of the network platform shown in FIG. 1, in accordance with some embodiments.

FIG. 15 illustrates an example compute node 1500 which could be used as a hardware platform for implementing all or a portion of each of the management platform 110, the computing devices 124*a-d*, and/or the administrator device 122, in accordance with some embodiments. The compute node 1500 generally includes one or more CPUs 1502, a memory module 1504 (e.g., RAM), a non-volatile data storage module 1506 (e.g., a hard-drive/disk-drive or array of hard-drives/disk-drives), a network I/O module 1508 (e.g., a network interface card (NIC) and/or a top-of-rack interface), and other modules 1510 such as user I/O, wireless communication modules, optical communication modules, system diagnostic or monitoring modules, or other modules. The CPUs 1502 are operable to perform processes in association with the memory module 1504 and the non-volatile data storage module 1506. In some embodiments, one or more compute nodes 1500 are configured to perform all or a portion of the processes 500, 700, 800, 900, and/or 1000 disclosed herein. In such embodiments, the memory module 1504 and the non-volatile data storage module 1506 may include all, or a portion of the programs and data required by the CPUs 1502 to perform the processes 500, 700, 800, 900, and/or 1000 disclosed herein.

Configurations

By way of example, a non-exhaustive list of configurations and variables for specification by an administrator (if applicable) include: Disable the "root" user; Disable inactive user accounts [variable(s): specify days until disabled]; Create user accounts [variable(s): specify one or more account names, home folder name, user type, and password]; Demote user accounts to Standard [variable(s): specify any usernames to exclude from being demoted]; Don't allow the Guest user to log in; Remove the Guest user home folder; Don't allow guests to connect to shared folders; Disable automatic login; Display login window as name and password; Disable and remove password hints; Disable fast user switching menu; Disable console login; Enforce a custom message for the lock screen [variable(s): specify message text]; Enforce a custom policy banner [variable(s): specify banner type and contents]; Set a CLI login banner [variable(s): specify login banner message text]; Disable the ability to login to another user's active and locked session; Disallow unlock with Apple Watch; Disallow unlock with Touch ID; Lock screen after Screen Saver or sleep begins [variable(s): specify minutes of delay to lock after sleep or screen saver begins]; Manage Screen Saver [variable(s): specify minutes of delay to start screen saver]; Ensure at least one Hot Corner is set to start Screen Saver or put the display to sleep [variable(s): specify action and location of hot corner]; Ensure no Hot Corner is set to disable Screen Saver; Ensure display sleep interval is greater than Screen Saver interval; Log out inactive users [variable(s): specify delay in minutes before users are logged out]; Reduce sudo timeout period to 0; Use a separate timestamp for each user/tty combo; Manage Location Services [variable(s): specify if location services is enabled or disabled]; Monitor Location Services; Disallow sending diagnostic and usage data to Apple; Manage Dock auto-hiding [variable(s): specify if dock auto-hiding should be enabled or disabled]; Enable OCSP and CRL certificate checking; Disallow simple passwords; Maximum failed login attempts [variable(s): specify how many failed attempts will lock the account]; Account lockout duration [variable(s): specify the number of minutes that an account will remain locked if locked due to failed login attempts]; Minimum number of complex characters [variable(s): specify minimum number of complex characters that can be used in passwords]; Minimum password length [variable(s): specify minimum character length of passwords]; Require alphanumeric password; Maximum allowed password age [variable(s): specify amount of days that can pass before the user is asked to change password again]; Password history [variable(s): specify amount of prior passwords that will be rejected during a password change]; Force user to reset password at next authentication; Advanced Password Management [variable(s): specify minimum length, numeric characters, symbolic characters, minimum symbolic characters, allowed repeating characters, allowed sequential characters, minimum uppercase letters, minimum lowercase letters, maximum failed logins, account lockout duration, days of inactivity before account is disabled, if password change should be forced at next authentication after deployment of parameter, amount of rejected prior passwords, maximum password age]; Set a Firmware Password [variable(s): specify the firmware password to be deployed]; Show all filename extensions in Finder; Manage the display of hidden files in Finder [variable(s): specify if hidden files should be shown or hidden]; Enable File Vault 2 [variable(s): specify if recovery key is presented to users when enabling filevault]; Escrow FileVault Recovery Keys to management platform; Report user accounts with File Vault Recovery Keys escrowed to iCloud; Report encryption status of attached APFS and CoreStorage volumes; Enable System Integrity Protection (SIP); Check Applications folder for appropriate permissions; Check Library folder for world writable files [variable(s): specify directories that should be excluded from having permissions checked and adjusted]; Check System folder for world writable files; Secure home folders; Set umask for all users; Disable Spotlight Suggestions; Prevent Spotlight from searching specified directories [variable(s): specify directories that should be excluded from spotlight searches]; Enable security auditing; Set security auditing flags [variable(s): specify prefix and flag for audits]; Set retention for security auditing [variable(s): specify days and/or file size that logs will be retained for]; Set security auditing maximum log file size [variable(s): specify maximum size a single file can become before a new file is created]; Secure access to audit records; Ensure Firewall is configured to log; Set retention for system.log [variable(s): specify amount of days system]; log should be retained for]; Set retention for appfirewall.log [variable(s): specify amount of days appfirewall]; log should be retained for]; Set retention for authd.log [variable(s): specify amount of days authd]; log should be retained for]; Set retention for install.log [variable(s): specify amount of days install]; log should be retained for]; Ensure date and time is set automatically [variable(s): specify time server URL]; Restrict NTP server to loopback interface; Ensure time is within appropriate limits; Enable Firewall; Enable stealth mode; Block all incoming connections; Manage number of allowed firewall rules [variable(s): specify the maximum allowed number of firewall rules]; Enable detailed logging; Manage Screen Sharing [variable(s): specify if screensharing should be disabled or enabled]; Disable File Sharing; Disable Printer Sharing; Disable Remote Login; Disable Remote Management; Disable Remote Apple Events; Disable Internet Sharing; Disable Bluetooth Sharing; Disable Content Caching; Disallow iCloud Reminders; Disallow iCloud Bookmarks; Disallow iCloud Notes; Disallow iCloud Keychain Sync; Disallow Find My Mac; Disable waking for network access; Disable sleeping when connected to power; Set hibernate (standbydelay) [variable(s): specify minutes of delay before standby starts]; Disable Siri; Disable System Preferences panes [variable(s): specify which of the following system preference panes are disabled on devices: general, dock, language & region, spotlight, displays, keyboard, trackpad, sound, icloud, wallet & Apple Pay, Network, Extensions, Touch ID, Parental controls, Date & Time, Accessibility, Ink, Desktop & Screen Saver, Mission Control, Security & Privacy, Notifications, Energy Saver, Mouse, Printers & Scanners, Startup Disk, Internet Accounts, App Store, Bluetooth, Sharing, Users & Groups, Siri, Time Machine, Profiles, CDs & DVDs]; Require an administrator password to access system-wide preferences; Monitor Time Machine status [variable(s): specify how many days are allowed before an alert is triggered]; Monitor encryption status of Time Machine volumes; Disable Handoff; Disallow password proximity requests; Manage Adobe Flash Player [variable(s): specify if Adobe Flash is set to automatically update or disabled and removed if found on devices]; Disable Java 6 from being the default Java runtime; Watchman Monitoring Client [variable(s): specify their companies Watchman Monitoring Client and group name]; Custom Compliance Scripts [variable(s): specify the name, run period (15 minutes or once per day) and the code as well as remediations scripts]; and/or Application Blacklisting [variable(s): specify the process name, path, developerID and/or bundle ID for applications that should be blocked; specify the message, button label and URL to be presented when application is blocked].

Other Aspects

Any method (also referred to as a "process" or an "approach") described or otherwise enabled by disclosure herein may be implemented by hardware components (e.g., machines), software modules (e.g., stored in machine-readable media), or a combination thereof. In particular, any method described or otherwise enabled by disclosure herein may be implemented by any concrete and tangible system described herein. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. Computing devices may include different devices, including a hand-held device, a laptop or notebook computer, a desktop computer, a personal digital assistant, a tablet, or other suitable computing device. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media, including but not limited to one or more non-volatile or volatile storage media, removable or non-removable media, integrated circuit media, magnetic storage media, optical storage media, or any other storage media, including RAM, ROM, and EEPROM, that may be patented under the laws of the jurisdiction in which this application is filed, but does not include machine-readable media that cannot be patented under the laws of the jurisdiction in which this application is filed (e.g., transitory propagating signals). Methods disclosed herein provide sets of rules that are performed. Systems that include one or more machines and one or more non-transitory machine-readable media for implementing any method described herein are also contemplated herein. One or more machines that perform or implement, or are configured, operable or adapted to perform or implement operations comprising the steps of any methods described herein are also contemplated herein. Each method described herein that is not prior art represents a specific set of rules in a process flow that provides significant advantages in the field of deploying configurations on computing devices and validating compliance with the configurations during scheduled intervals. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

What is claimed is:

1. A method comprising:
generating, using a web-portal provided by a management platform operating at a server, initialization orchestration module configuration data using a graphical customization user interface, the graphical customization user interface providing a graphical preview of a graphical status screen user interface;
displaying, by an initialization orchestration module instantiated at a computing device, the graphical status screen user interface in accordance with the initialization orchestration module configuration data;
processing, by a device agent instantiated at the computing device, a first configuration item of a list of configuration items; and
displaying, by the initialization orchestration module using the graphical status screen user interface, a status of the first configuration item in accordance with first status messages regarding the first configuration item as the device agent processes the first configuration item.

2. The method of claim 1, wherein:
the graphical status screen user interface is a first focus-locked interface.

3. The method of claim 1, wherein the method further comprises:
determining, by the initialization orchestration module using the first status messages, that an error occurred while processing the first configuration item; and
remediating, by the initialization orchestration module, the error that occurred.

4. The method of claim 3, wherein:
the error that occurred is a loss in network connectivity; and
the remediation, by the initialization orchestration module, comprises displaying a second focus-locked user interface for network selection at the computing device.

5. The method of claim 3, wherein:
the error that occurred is a loss in network connectivity; and
the remediation comprises pausing, by the device agent, downloading data until network connectivity is restored and receiving, by the initialization orchestration module, an indication that downloading has been paused by the device agent.

6. The method of claim 1, wherein:
instantiating the initialization orchestration module at the computing device comprises:
determining, by the device agent, that the device agent can access an initialization orchestration module application programming interface (API) at the management platform;
receiving, by the device agent using the initialization orchestration module API, the initialization orchestration module configuration data from the management platform;
determining, by the device agent based on the initialization orchestration module configuration data, that the initialization orchestration module is permitted to be instantiated at the computing device; and
instantiating, by the device agent, the initialization orchestration module at the computing device.

7. The method of claim 1, further comprising:
processing, by the device agent, a second configuration item of the list of configuration items;
wherein:
the first configuration item is a software application, and processing the first configuration item comprises installing the software application at the computing device; and
the second configuration item is a script, and processing the second configuration item comprises executing the script at the computing device.

8. The method of claim 1, further comprising:
receiving, at the initialization orchestration module from the device agent, second status messages indicating that there are no more items in the list of configuration items to be processed; and
displaying, by the initialization orchestration module at the computing device, a graphical completion screen user interface in accordance with the initialization orchestration module configuration data.

9. The method of claim 8, wherein:
the graphical completion screen user interface comprises one or more completion tiles, one or more of the completion tiles being operable to open a website link upon user selection of that completion tile.

10. The method of claim 8, wherein:
the graphical completion screen user interface comprises one or more completion tiles, one or more of the completion tiles being configured to launch an application on the computing device upon user selection of that completion tile.

11. A method comprising:
generating, using a web-portal provided by a management platform operating at a server, initialization orchestration module configuration data using a graphical customization user interface, the graphical customization user interface providing a graphical preview of a graphical status screen user interface;
transmitting, by a device agent instantiated at a computing device, the initialization orchestration module configuration data to an initialization orchestration module instantiated at the computing device;

displaying, by the initialization orchestration module, the graphical status screen user interface in accordance with the initialization orchestration module configuration data;

processing, by the device agent, a first configuration item of a list of configuration items;

transmitting, by the device agent, first status messages to the initialization orchestration module regarding the first configuration item as the device agent processes the first configuration item; and displaying, by the initialization orchestration module using the graphical status screen user interface, a status of the first configuration item in accordance with the first status messages.

12. The method of claim 11, wherein:
the graphical status screen user interface is a first focus-locked interface.

13. The method of claim 11, wherein the method further comprises:
determining, by the initialization orchestration module using the first status messages, that an error has occurred while processing the first configuration item; and
remediating, by the initialization orchestration module, the error that occurred.

14. The method of claim 13, wherein:
the error that occurred is a loss in network connectivity; and
the remediation, by the initialization orchestration module, comprises displaying a second focus-locked user interface for network selection at the computing device.

15. The method of claim 13, wherein:
the error that occurred is a loss in network connectivity; and
the remediation comprises pausing, by the device agent, downloading data until network connectivity is restored and receiving, by the initialization orchestration module, an indication that downloading has been paused by the device agent.

16. The method of claim 11, wherein:
instantiating the initialization orchestration module at the computing device comprises:
determining, by the device agent, that the device agent can access an initialization orchestration module application programming interface (API) at the management platform;
receiving, by the device agent using the initialization orchestration module API, the initialization orchestration module configuration data from the management platform;
determining, by the device agent based on the initialization orchestration module configuration data, that the initialization orchestration module is permitted to be instantiated at the computing device; and
instantiating, by the device agent, the initialization orchestration module at the computing device.

17. The method of claim 11, further comprising:
processing, by the device agent, a second configuration item of the list of configuration items;
wherein:
the first configuration item is a software application and processing the first configuration item comprises installing the software application at the computing device; and
the second configuration item is a script and processing the second configuration item comprises executing the script at the computing device.

18. The method of claim 11, further comprising:
receiving, at the initialization orchestration module from the device agent, second status messages indicating that there are no more items in the list of configuration items to be processed; and
displaying, by the initialization orchestration module at the computing device, a graphical completion screen user interface in accordance with the initialization orchestration module configuration data.

19. The method of claim 18, wherein:
the graphical completion screen user interface comprises one or more completion tiles, one or more of the completion tiles being operable to operable to open a website link upon user selection of that completion tile.

20. The method of claim 18, wherein:
the graphical completion screen user interface comprises one or more completion tiles, one or more of the completion tiles being configured to launch an application on the computing device upon user selection of that completion tile.

* * * * *